United States Patent
McMillan et al.

(10) Patent No.: US 9,681,204 B2
(45) Date of Patent: Jun. 13, 2017

(54) METHODS AND APPARATUS TO VALIDATE A TAG FOR MEDIA

(71) Applicant: The Nielsen Company (US), LLC, New York, NY (US)

(72) Inventors: Francis Gavin McMillan, Tarpon Springs, FL (US); Alexandros Deliyannis, Tampa, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 15/181,399

(22) Filed: Jun. 13, 2016

(65) Prior Publication Data

US 2016/0301988 A1 Oct. 13, 2016

Related U.S. Application Data

(63) Continuation of application No. 13/181,147, filed on Jul. 12, 2011, now Pat. No. 9,380,356.

(Continued)

(51) Int. Cl.
*G06F 17/30* (2006.01)
*H04N 21/84* (2011.01)
(Continued)

(52) U.S. Cl.
CPC ............ *H04N 21/84* (2013.01); *H04H 20/31* (2013.01); *H04H 60/31* (2013.01); *H04H 60/37* (2013.01);
(Continued)

(58) Field of Classification Search
CPC ........................... H04H 2201/90; H04H 60/31
(Continued)

(56) References Cited

U.S. PATENT DOCUMENTS 4,230,990 A 10/1980 Lert, Jr. et al.
4,647,974 A 3/1987 Butler et al.
(Continued)

FOREIGN PATENT DOCUMENTS

AU 8976601 2/2002
AU 9298201 4/2002
(Continued)

OTHER PUBLICATIONS

Mexican Patent Office, "Office Action", issued in connection with Mexican Patent Application No. MX/a/2014/000280, dated Jan. 21, 2015 (5 pages, English translation included).

(Continued)

*Primary Examiner* — Mahesh Dwivedi
(74) *Attorney, Agent, or Firm* — Hanley, Flight & Zimmerman, LLC

(57) ABSTRACT

Methods and apparatus to validate a tag for media are disclosed. An example method includes obtaining first identification information extracted from a tag distributed with media presented at a presentation location, obtaining second identification information determined from at least one of a) inherent information of at least one of audio or video of the media presented at the presentation location or b) a watermark embedded in at least one of the audio or the video of the media presented at the presentation, comparing the first identification information with the second identification information, and when first identification information does not substantially match the second identification information, preventing the tag from being used to report exposure of the media.

21 Claims, 5 Drawing Sheets

Related U.S. Application Data

(60) Provisional application No. 61/474,728, filed on Apr. 12, 2011.

(51) Int. Cl.

| | | |
|---|---|---|
| *H04N 21/8352* | (2011.01) | |
| *H04N 21/8358* | (2011.01) | |
| *H04N 21/24* | (2011.01) | |
| *H04N 21/442* | (2011.01) | |
| *H04H 60/31* | (2008.01) | |
| *H04H 20/31* | (2008.01) | |
| *H04H 60/37* | (2008.01) | |
| *H04H 60/40* | (2008.01) | |
| *H04H 60/73* | (2008.01) | |
| *H04N 21/61* | (2011.01) | |
| *H04N 21/6543* | (2011.01) | |
| *H04N 21/658* | (2011.01) | |

(52) U.S. Cl.
CPC ............ *H04H 60/40* (2013.01); *H04H 60/73* (2013.01); *H04N 21/2407* (2013.01); *H04N 21/44204* (2013.01); *H04N 21/44222* (2013.01); *H04N 21/6125* (2013.01); *H04N 21/8352* (2013.01); *H04N 21/8358* (2013.01); *H04H 2201/50* (2013.01); *H04H 2201/90* (2013.01); *H04N 21/6543* (2013.01); *H04N 21/6582* (2013.01)

(58) Field of Classification Search
USPC .......................................................... 725/9
See application file for complete search history.

(56) References Cited

U.S. PATENT DOCUMENTS

| | | |
|---|---|---|
| 4,677,466 A | 6/1987 | Lert, Jr. et al. |
| 4,697,209 A | 9/1987 | Kiewit et al. |
| 4,745,468 A | 5/1988 | Von Kohorn |
| 4,876,592 A | 10/1989 | Von Kohorn |
| 4,876,736 A | 10/1989 | Kiewit |
| 4,926,255 A | 5/1990 | Von Kohorn |
| 4,973,952 A | 11/1990 | Malec et al. |
| 5,003,591 A | 3/1991 | Kauffman et al. |
| 5,019,899 A | 5/1991 | Boles et al. |
| 5,023,929 A | 6/1991 | Call |
| 5,034,807 A | 7/1991 | Von Kohorn |
| 5,057,915 A | 10/1991 | Von Kohorn |
| 5,081,680 A | 1/1992 | Bennett |
| 5,128,752 A | 7/1992 | Von Kohorn |
| 5,227,874 A | 7/1993 | Von Kohorn |
| 5,249,044 A | 9/1993 | Von Kohorn |
| 5,283,734 A | 2/1994 | Von Kohorn |
| 5,331,544 A | 7/1994 | Lu et al. |
| 5,401,946 A | 3/1995 | Weinblatt |
| 5,425,100 A | 6/1995 | Thomas et al. |
| 5,481,294 A | 1/1996 | Thomas et al. |
| 5,512,933 A | 4/1996 | Wheatley et al. |
| 5,524,195 A | 6/1996 | Clanton, III et al. |
| 5,543,856 A | 8/1996 | Rosser et al. |
| 5,559,716 A | 9/1996 | Gaalswyk |
| 5,574,962 A | 11/1996 | Fardeau et al. |
| 5,579,124 A | 11/1996 | Aijala et al. |
| 5,594,934 A | 1/1997 | Lu et al. |
| 5,629,739 A | 5/1997 | Dougherty |
| 5,659,366 A | 8/1997 | Kerman |
| 5,666,293 A | 9/1997 | Metz et al. |
| 5,719,634 A | 2/1998 | Keery et al. |
| 5,734,413 A | 3/1998 | Lappington et al. |
| 5,740,035 A | 4/1998 | Cohen et al. |
| 5,815,671 A | 9/1998 | Morrison |
| 5,841,978 A | 11/1998 | Rhoads |
| 5,848,155 A | 12/1998 | Cox |
| 5,850,249 A | 12/1998 | Massetti et al. |
| 5,872,588 A | 2/1999 | Aras et al. |
| 5,880,789 A | 3/1999 | Inaba |
| 5,893,067 A | 4/1999 | Bender et al. |
| 5,910,987 A | 6/1999 | Ginter et al. |
| 5,918,223 A | 6/1999 | Blum et al. |
| 5,930,369 A | 7/1999 | Cox et al. |
| 5,933,789 A | 8/1999 | Byun et al. |
| 5,956,716 A | 9/1999 | Kenner et al. |
| 5,966,120 A | 10/1999 | Arazi et al. |
| 5,974,299 A | 10/1999 | Massetti |
| 5,974,396 A | 10/1999 | Anderson et al. |
| 5,987,855 A | 11/1999 | Dey et al. |
| 6,034,722 A | 3/2000 | Viney et al. |
| 6,049,830 A | 4/2000 | Saib |
| 6,055,573 A | 4/2000 | Gardenswartz et al. |
| 6,061,793 A | 5/2000 | Tewfik et al. |
| 6,088,659 A | 7/2000 | Kelley et al. |
| 6,108,637 A | 8/2000 | Blumenau |
| 6,115,654 A | 9/2000 | Eid et al. |
| 6,154,209 A | 11/2000 | Naughton et al. |
| 6,208,735 B1 | 3/2001 | Cox et al. |
| 6,216,129 B1 | 4/2001 | Eldering |
| 6,282,573 B1 | 8/2001 | Darago et al. |
| 6,286,036 B1 | 9/2001 | Rhoads |
| 6,286,140 B1 | 9/2001 | Ivanyi |
| 6,298,348 B1 | 10/2001 | Eldering |
| 6,308,327 B1 | 10/2001 | Liu et al. |
| 6,310,956 B1 | 10/2001 | Morito et al. |
| 6,327,619 B1 | 12/2001 | Blumenau |
| 6,331,876 B1 | 12/2001 | Koster et al. |
| 6,335,736 B1 | 1/2002 | Wagner et al. |
| 6,363,159 B1 | 3/2002 | Rhoads |
| 6,363,488 B1 | 3/2002 | Ginter et al. |
| 6,377,993 B1 | 4/2002 | Brandt et al. |
| 6,389,055 B1 | 5/2002 | August et al. |
| 6,400,827 B1 | 6/2002 | Rhoads |
| 6,411,725 B1 | 6/2002 | Rhoads |
| 6,421,445 B1 | 7/2002 | Jensen et al. |
| 6,442,285 B2 | 8/2002 | Rhoads et al. |
| 6,463,445 B1 | 10/2002 | Suzuki et al. |
| 6,487,564 B1 | 11/2002 | Asai et al. |
| 6,505,160 B1 | 1/2003 | Levy et al. |
| 6,512,836 B1 | 1/2003 | Xie et al. |
| 6,513,014 B1 | 1/2003 | Walker et al. |
| 6,519,509 B1 | 2/2003 | Nierlich et al. |
| 6,522,771 B2 | 2/2003 | Rhoads |
| 6,539,095 B1 | 3/2003 | Rhoads |
| 6,546,556 B1 | 4/2003 | Kataoka et al. |
| 6,553,178 B2 | 4/2003 | Abecassis |
| 6,642,966 B1 | 11/2003 | Limaye |
| 6,647,269 B2 | 11/2003 | Hendrey et al. |
| 6,651,253 B2 | 11/2003 | Dudkiewicz et al. |
| 6,654,480 B2 | 11/2003 | Rhoads |
| 6,665,873 B1 | 12/2003 | Van Gestel et al. |
| 6,671,732 B1 | 12/2003 | Weiner |
| 6,675,383 B1 | 1/2004 | Wheeler et al. |
| 6,683,966 B1 | 1/2004 | Tian et al. |
| 6,710,815 B1 | 3/2004 | Billmaier et al. |
| 6,714,683 B1 | 3/2004 | Tian et al. |
| 6,741,684 B2 | 5/2004 | Kaars |
| 6,750,985 B2 | 6/2004 | Rhoads |
| 6,766,523 B2 | 7/2004 | Herley |
| 6,795,972 B2 | 9/2004 | Rovira |
| 6,804,379 B2 | 10/2004 | Rhoads |
| 6,829,368 B2 | 12/2004 | Meyer et al. |
| 6,853,634 B1 | 2/2005 | Davies et al. |
| 6,871,323 B2 | 3/2005 | Wagner et al. |
| 6,873,688 B1 | 3/2005 | Aarnio |
| 6,941,275 B1 | 9/2005 | Swierczek |
| 6,956,575 B2 | 10/2005 | Nakazawa et al. |
| 6,968,315 B1 | 11/2005 | Nakisa |
| 6,968,564 B1 | 11/2005 | Srinivasan |
| 6,970,886 B1 | 11/2005 | Conwell et al. |
| 6,996,213 B1 | 2/2006 | De Jong |
| 7,003,731 B1 | 2/2006 | Rhoads et al. |
| 7,007,166 B1 | 2/2006 | Moskowitz et al. |
| 7,032,178 B1 | 4/2006 | McKnight et al. |
| 7,050,603 B2 | 5/2006 | Rhoads et al. |
| 7,051,086 B2 | 5/2006 | Rhoads et al. |

(56) References Cited

U.S. PATENT DOCUMENTS

| | | |
|---|---|---|
| 7,058,697 B2 | 6/2006 | Rhoads |
| 7,082,434 B2 | 7/2006 | Gosselin |
| 7,095,871 B2 | 8/2006 | Jones et al. |
| 7,143,949 B1 | 12/2006 | Hannigan |
| 7,158,943 B2 | 1/2007 | van der Riet |
| 7,171,018 B2 | 1/2007 | Rhoads et al. |
| 7,174,293 B2 | 2/2007 | Kenyon et al. |
| 7,181,042 B2 | 2/2007 | Tian |
| 7,185,201 B2 | 2/2007 | Rhoads et al. |
| 7,194,752 B1 | 3/2007 | Kenyon et al. |
| 7,197,156 B1 | 3/2007 | Levy |
| 7,215,280 B1 | 5/2007 | Percy et al. |
| 7,221,405 B2 | 5/2007 | Basson et al. |
| 7,227,972 B2 | 6/2007 | Brundage et al. |
| 7,254,249 B2 | 8/2007 | Rhoads et al. |
| 7,273,978 B2 | 9/2007 | Uhle |
| 7,317,716 B1 | 1/2008 | Boni et al. |
| 7,328,153 B2 | 2/2008 | Wells et al. |
| 7,346,512 B2 | 3/2008 | Li-Chun Wang et al. |
| 7,356,700 B2 | 4/2008 | Noridomi et al. |
| 7,363,278 B2 | 4/2008 | Schmelzer et al. |
| 7,369,678 B2 | 5/2008 | Rhoads |
| 7,421,723 B2 | 9/2008 | Harkness et al. |
| 7,443,292 B2 | 10/2008 | Jensen et al. |
| 7,451,317 B2 | 11/2008 | Oh et al. |
| 7,463,143 B2 | 12/2008 | Forr et al. |
| 7,519,658 B1 | 4/2009 | Anglin et al. |
| 7,592,908 B2 | 9/2009 | Zhang et al. |
| 7,623,823 B2 | 11/2009 | Zito et al. |
| 7,643,090 B2 | 1/2010 | Ramaswamy et al. |
| 7,689,823 B2 | 3/2010 | Shen et al. |
| 7,712,114 B2 | 5/2010 | Ramaswamy |
| 7,761,465 B1 | 7/2010 | Nonaka et al. |
| 7,827,312 B2 | 11/2010 | Ramaswamy et al. |
| 7,962,934 B1 | 6/2011 | Eldering et al. |
| 8,065,703 B2 | 11/2011 | Wilson et al. |
| 8,176,322 B2 | 5/2012 | Lee et al. |
| 8,179,475 B2 | 5/2012 | Sandrew |
| 8,578,272 B2 | 11/2013 | Pantos et al. |
| 8,706,685 B1 | 4/2014 | Smith et al. |
| 8,732,185 B1 | 5/2014 | Lynn et al. |
| 8,839,338 B2 | 9/2014 | Eyer |
| 8,856,869 B1 | 10/2014 | Brinskelle |
| 9,197,421 B2 | 11/2015 | Besehanic |
| 9,209,978 B2 | 12/2015 | Besehanic |
| 9,313,544 B2 | 4/2016 | Besehanic |
| 9,357,261 B2 | 5/2016 | Besehanic |
| 9,609,034 B2 | 3/2017 | Ramaswamy et al. |
| 2001/0031066 A1 | 10/2001 | Meyer et al. |
| 2001/0044851 A1 | 11/2001 | Rothman et al. |
| 2001/0044899 A1 | 11/2001 | Levy |
| 2002/0001395 A1* | 1/2002 | Davis .............. G06F 21/10 382/100 |
| 2002/0012443 A1 | 1/2002 | Rhoads et al. |
| 2002/0016969 A1 | 2/2002 | Kimble |
| 2002/0032734 A1 | 3/2002 | Rhoads |
| 2002/0033842 A1 | 3/2002 | Zetts |
| 2002/0053078 A1 | 5/2002 | Holtz et al. |
| 2002/0056089 A1 | 5/2002 | Houston |
| 2002/0056094 A1 | 5/2002 | Dureau |
| 2002/0059218 A1 | 5/2002 | August et al. |
| 2002/0062382 A1 | 5/2002 | Rhoads et al. |
| 2002/0069037 A1 | 6/2002 | Hendrickson et al. |
| 2002/0083324 A1 | 6/2002 | Hirai |
| 2002/0091991 A1 | 7/2002 | Castro |
| 2002/0102993 A1 | 8/2002 | Hendrey et al. |
| 2002/0108125 A1 | 8/2002 | Joao |
| 2002/0111934 A1 | 8/2002 | Narayan |
| 2002/0112002 A1 | 8/2002 | Abato |
| 2002/0120925 A1 | 8/2002 | Logan |
| 2002/0124246 A1 | 9/2002 | Kaminsky et al. |
| 2002/0133705 A1 | 9/2002 | Tagashira et al. |
| 2002/0138852 A1 | 9/2002 | Reynolds et al. |
| 2002/0144262 A1 | 10/2002 | Plotnick et al. |
| 2002/0144273 A1 | 10/2002 | Reto |
| 2002/0150247 A1 | 10/2002 | Linnartz et al. |
| 2002/0157112 A1 | 10/2002 | Kuhn |
| 2002/0162118 A1 | 10/2002 | Levy et al. |
| 2002/0174425 A1 | 11/2002 | Markel et al. |
| 2002/0194592 A1 | 12/2002 | Tsuchida et al. |
| 2002/0197063 A1 | 12/2002 | Cho |
| 2003/0021441 A1 | 1/2003 | Levy et al. |
| 2003/0039465 A1 | 2/2003 | Bjorgan et al. |
| 2003/0055949 A1 | 3/2003 | Coulombe et al. |
| 2003/0079131 A1 | 4/2003 | Reefman |
| 2003/0088674 A1 | 5/2003 | Ullman et al. |
| 2003/0093810 A1 | 5/2003 | Taniguchi |
| 2003/0105870 A1 | 6/2003 | Baum |
| 2003/0108200 A1 | 6/2003 | Sako |
| 2003/0115598 A1 | 6/2003 | Pantoja |
| 2003/0149890 A1 | 8/2003 | Shen et al. |
| 2003/0177488 A1 | 9/2003 | Smith et al. |
| 2003/0185232 A1 | 10/2003 | Moore et al. |
| 2004/0003394 A1 | 1/2004 | Ramaswamy |
| 2004/0009763 A1 | 1/2004 | Stone et al. |
| 2004/0019690 A1 | 1/2004 | Cardno et al. |
| 2004/0025181 A1 | 2/2004 | Addington et al. |
| 2004/0037271 A1 | 2/2004 | Liscano et al. |
| 2004/0038692 A1 | 2/2004 | Muzaffar |
| 2004/0064319 A1 | 4/2004 | Nehauser et al. |
| 2004/0073916 A1 | 4/2004 | Petrovic et al. |
| 2004/0073951 A1 | 4/2004 | Bae et al. |
| 2004/0088556 A1 | 5/2004 | Weirauch |
| 2004/0125125 A1 | 7/2004 | Levy |
| 2004/0128514 A1 | 7/2004 | Rhoads |
| 2004/0137929 A1 | 7/2004 | Jones et al. |
| 2004/0146161 A1 | 7/2004 | DeJong |
| 2004/0153649 A1 | 8/2004 | Rhoads et al. |
| 2004/0156489 A1 | 8/2004 | Vishik et al. |
| 2004/0199387 A1 | 10/2004 | Wang et al. |
| 2004/0254887 A1 | 12/2004 | Jacoby |
| 2005/0028189 A1 | 2/2005 | Heine et al. |
| 2005/0033758 A1 | 2/2005 | Baxter |
| 2005/0058319 A1 | 3/2005 | Rhoads et al. |
| 2005/0086682 A1 | 4/2005 | Burges et al. |
| 2005/0138179 A1 | 6/2005 | Encarnaction et al. |
| 2005/0144004 A1 | 6/2005 | Bennett et al. |
| 2005/0152287 A1 | 7/2005 | Yokomitsu et al. |
| 2005/0177738 A1 | 8/2005 | Van Der Veen et al. |
| 2005/0188297 A1 | 8/2005 | Knight et al. |
| 2005/0192933 A1 | 9/2005 | Rhoads et al. |
| 2005/0193425 A1 | 9/2005 | Sull et al. |
| 2005/0204379 A1 | 9/2005 | Yamamori |
| 2005/0216346 A1 | 9/2005 | Kusumoto et al. |
| 2005/0234774 A1 | 10/2005 | Dupree |
| 2006/0026431 A1 | 2/2006 | Campello De Souza |
| 2006/0031297 A1 | 2/2006 | Zuidema |
| 2006/0056625 A1 | 3/2006 | Nakabayashi et al. |
| 2006/0059277 A1 | 3/2006 | Zito et al. |
| 2006/0062426 A1 | 3/2006 | Levy et al. |
| 2006/0095401 A1 | 5/2006 | Krikorian et al. |
| 2006/0107195 A1 | 5/2006 | Ramaswamy et al. |
| 2006/0107302 A1 | 5/2006 | Zdepski |
| 2006/0136564 A1 | 6/2006 | Ambrose |
| 2006/0161635 A1 | 7/2006 | Lamkin et al. |
| 2006/0167747 A1 | 7/2006 | Goodman et al. |
| 2006/0168613 A1 | 7/2006 | Wood et al. |
| 2006/0195614 A1 | 8/2006 | Sena et al. |
| 2006/0195886 A1 | 8/2006 | Ashley |
| 2006/0212705 A1 | 9/2006 | Thommana et al. |
| 2006/0221173 A1 | 10/2006 | Duncan |
| 2006/0224798 A1 | 10/2006 | Klein et al. |
| 2006/0242325 A1 | 10/2006 | Ramaswamy et al. |
| 2007/0006250 A1 | 1/2007 | Croy et al. |
| 2007/0016918 A1 | 1/2007 | Alcorn et al. |
| 2007/0030966 A1 | 2/2007 | Sra et al. |
| 2007/0050832 A1 | 3/2007 | Wright et al. |
| 2007/0055987 A1 | 3/2007 | Lu et al. |
| 2007/0074020 A1 | 3/2007 | Nishimura |
| 2007/0083611 A1 | 4/2007 | Farago et al. |
| 2007/0110089 A1 | 5/2007 | Essafi et al. |
| 2007/0112837 A1 | 5/2007 | Houh et al. |
| 2007/0118375 A1 | 5/2007 | Kenyon et al. |
| 2007/0118873 A1 | 5/2007 | Houh et al. |

(56) References Cited

U.S. PATENT DOCUMENTS

| | | |
|---|---|---|
| 2007/0124771 A1 | 5/2007 | Shvadron |
| 2007/0127717 A1 | 6/2007 | Herre et al. |
| 2007/0129952 A1 | 6/2007 | Kenyon et al. |
| 2007/0133223 A1 | 6/2007 | Fredley et al. |
| 2007/0136753 A1 | 6/2007 | Bovenschulte et al. |
| 2007/0136777 A1 | 6/2007 | Hasek et al. |
| 2007/0149114 A1 | 6/2007 | Danilenko |
| 2007/0157262 A1 | 7/2007 | Ramaswamy et al. |
| 2007/0162927 A1 | 7/2007 | Ramaswamy et al. |
| 2007/0186228 A1* | 8/2007 | Ramaswamy ......... H04H 60/37 725/14 |
| 2007/0198738 A1 | 8/2007 | Angiolillo et al. |
| 2007/0201835 A1 | 8/2007 | Rhoads |
| 2007/0226760 A1 | 9/2007 | Neuhauser et al. |
| 2007/0250901 A1 | 10/2007 | McIntire et al. |
| 2007/0266395 A1 | 11/2007 | Lee et al. |
| 2007/0274523 A1 | 11/2007 | Rhoads |
| 2007/0276925 A1 | 11/2007 | La Joie et al. |
| 2007/0276926 A1 | 11/2007 | La Joie et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0027734 A1 | 1/2008 | Zhao et al. |
| 2008/0028223 A1 | 1/2008 | Rhoads |
| 2008/0040354 A1 | 2/2008 | Ray et al. |
| 2008/0046499 A1 | 2/2008 | Cabrera et al. |
| 2008/0059160 A1 | 3/2008 | Saunders et al. |
| 2008/0065507 A1 | 3/2008 | Morrison et al. |
| 2008/0077956 A1 | 3/2008 | Morrison et al. |
| 2008/0082510 A1 | 4/2008 | Wang et al. |
| 2008/0082922 A1 | 4/2008 | Biniak et al. |
| 2008/0083003 A1 | 4/2008 | Biniak et al. |
| 2008/0104624 A1 | 5/2008 | Narasimhan et al. |
| 2008/0120661 A1 | 5/2008 | Ludvig et al. |
| 2008/0126420 A1* | 5/2008 | Wright .................... H04H 60/64 |
| 2008/0133223 A1 | 6/2008 | Son et al. |
| 2008/0139182 A1 | 6/2008 | Levy et al. |
| 2008/0140573 A1 | 6/2008 | Levy et al. |
| 2008/0168503 A1 | 7/2008 | Sparrell |
| 2008/0184132 A1 | 7/2008 | Zato |
| 2008/0200999 A1 | 8/2008 | Hakansson |
| 2008/0209491 A1 | 8/2008 | Hasek |
| 2008/0219496 A1 | 9/2008 | Tewfik et al. |
| 2008/0219637 A1 | 9/2008 | Sandrew |
| 2008/0235077 A1 | 9/2008 | Harkness et al. |
| 2008/0240490 A1 | 10/2008 | Finkelstein et al. |
| 2008/0249961 A1 | 10/2008 | Harkness et al. |
| 2008/0263579 A1 | 10/2008 | Mears et al. |
| 2008/0294487 A1* | 11/2008 | Nasser .................... G06Q 30/02 705/7.32 |
| 2008/0310629 A1 | 12/2008 | Van Der Veen et al. |
| 2009/0007169 A1 | 1/2009 | Headley et al. |
| 2009/0015599 A1 | 1/2009 | Bennett et al. |
| 2009/0070408 A1 | 3/2009 | White |
| 2009/0074240 A1 | 3/2009 | Srinivasan |
| 2009/0083417 A1 | 3/2009 | Hughes et al. |
| 2009/0086812 A1 | 4/2009 | Ducharme |
| 2009/0103887 A1 | 4/2009 | Choi et al. |
| 2009/0106297 A1 | 4/2009 | Wright et al. |
| 2009/0119723 A1 | 5/2009 | Tinsman |
| 2009/0129588 A1 | 5/2009 | Takakusu et al. |
| 2009/0133093 A1 | 5/2009 | Hodge |
| 2009/0150553 A1 | 6/2009 | Collart et al. |
| 2009/0157731 A1 | 6/2009 | Zigler et al. |
| 2009/0158318 A1 | 6/2009 | Levy |
| 2009/0164378 A1 | 6/2009 | West et al. |
| 2009/0164564 A1 | 6/2009 | Willis |
| 2009/0210892 A1* | 8/2009 | Ramaswamy ......... H04H 60/375 725/9 |
| 2009/0228492 A1 | 9/2009 | Valdez et al. |
| 2009/0248886 A1 | 10/2009 | Tan et al. |
| 2009/0259325 A1 | 10/2009 | Topchy et al. |
| 2009/0259745 A1 | 10/2009 | Lee |
| 2009/0265214 A1 | 10/2009 | Jobs et al. |
| 2009/0276313 A1 | 11/2009 | Wilhelm |
| 2009/0305680 A1* | 12/2009 | Swift .................... H04L 12/2602 455/414.1 |
| 2009/0307061 A1 | 12/2009 | Monighetti et al. |
| 2009/0307084 A1 | 12/2009 | Monighetti et al. |
| 2010/0008586 A1 | 1/2010 | Meyer et al. |
| 2010/0009722 A1 | 1/2010 | Levy et al. |
| 2010/0023405 A1 | 1/2010 | Liu |
| 2010/0083299 A1* | 4/2010 | Nelson .................... H04H 60/32 725/19 |
| 2010/0088583 A1 | 4/2010 | Schachter |
| 2010/0094897 A1 | 4/2010 | Sumrall et al. |
| 2010/0121936 A1 | 5/2010 | Liu et al. |
| 2010/0135638 A1 | 6/2010 | Mio |
| 2010/0174774 A1 | 7/2010 | Kern et al. |
| 2010/0226526 A1 | 9/2010 | Modro et al. |
| 2010/0241963 A1 | 9/2010 | Kulis et al. |
| 2010/0246955 A1* | 9/2010 | Wright ............... G06K 9/00711 382/173 |
| 2010/0262711 A1 | 10/2010 | Bouazizi |
| 2010/0280641 A1 | 11/2010 | Harkness et al. |
| 2010/0306257 A1 | 12/2010 | Levy |
| 2010/0318600 A1 | 12/2010 | Furbeck |
| 2011/0016231 A1 | 1/2011 | Ramaswamy et al. |
| 2011/0030031 A1 | 2/2011 | Lussier et al. |
| 2011/0055314 A1 | 3/2011 | Rosenstein et al. |
| 2011/0066437 A1* | 3/2011 | Luff ....................... G06Q 30/02 704/254 |
| 2011/0078721 A1 | 3/2011 | Wang et al. |
| 2011/0088053 A1* | 4/2011 | Lee ........................ H04H 60/45 725/19 |
| 2011/0123062 A1 | 5/2011 | Hilu |
| 2011/0145246 A1 | 6/2011 | Prager et al. |
| 2011/0145581 A1 | 6/2011 | Malhotra et al. |
| 2011/0154185 A1 | 6/2011 | Kern et al. |
| 2011/0157475 A1 | 6/2011 | Wright et al. |
| 2011/0173200 A1 | 7/2011 | Yang et al. |
| 2011/0196921 A1 | 8/2011 | Sylthe |
| 2011/0252118 A1 | 10/2011 | Pantos et al. |
| 2011/0320287 A1 | 12/2011 | Holt et al. |
| 2011/0321003 A1 | 12/2011 | Doig et al. |
| 2012/0023516 A1 | 1/2012 | Wolinsky et al. |
| 2012/0036350 A1 | 2/2012 | Kuno et al. |
| 2012/0045054 A1 | 2/2012 | Main et al. |
| 2012/0096546 A1 | 4/2012 | Dilley et al. |
| 2012/0124605 A1 | 5/2012 | Praden |
| 2012/0137015 A1 | 5/2012 | Sun |
| 2012/0209949 A1 | 8/2012 | Deliyannis et al. |
| 2012/0239809 A1 | 9/2012 | Mazumdar et al. |
| 2012/0284804 A1 | 11/2012 | Lindquist et al. |
| 2012/0308071 A1 | 12/2012 | Ramsdell et al. |
| 2012/0311126 A1 | 12/2012 | Jadallah et al. |
| 2013/0007298 A1 | 1/2013 | Ramaswamy et al. |
| 2013/0007794 A1 | 1/2013 | Besehanic et al. |
| 2013/0054972 A1 | 2/2013 | Thorwirth |
| 2013/0061275 A1 | 3/2013 | Seo et al. |
| 2013/0097285 A1 | 4/2013 | van Zwol et al. |
| 2013/0124747 A1 | 5/2013 | Harrang et al. |
| 2013/0166868 A1 | 6/2013 | Jarnikov et al. |
| 2013/0202150 A1 | 8/2013 | Sinha et al. |
| 2013/0231931 A1 | 9/2013 | Kulis et al. |
| 2013/0247078 A1 | 9/2013 | Nikankin et al. |
| 2013/0268623 A1 | 10/2013 | Besehanic et al. |
| 2013/0268630 A1 | 10/2013 | Besehanic et al. |
| 2013/0290508 A1 | 10/2013 | Besehanic et al. |
| 2013/0291001 A1 | 10/2013 | Besehanic et al. |
| 2013/0297410 A1 | 11/2013 | Oh et al. |
| 2013/0297737 A1 | 11/2013 | Wajs et al. |
| 2013/0311776 A1 | 11/2013 | Besehanic |
| 2013/0311780 A1 | 11/2013 | Besehanic |
| 2014/0082220 A1 | 3/2014 | Ramaswamy et al. |
| 2014/0105392 A1 | 4/2014 | Robert et al. |
| 2014/0229629 A1 | 8/2014 | Besehanic |
| 2014/0229970 A1 | 8/2014 | Besehanic |
| 2014/0244828 A1 | 8/2014 | Besehanic |
| 2014/0298365 A1 | 10/2014 | Matsubara et al. |

(56) References Cited

U.S. PATENT DOCUMENTS

| | | | |
|---|---|---|---|
| 2014/0301386 | A1 | 10/2014 | Harrenstien et al. |
| 2016/0043916 | A1 | 2/2016 | Ramaswamy et al. |
| 2016/0127466 | A1 | 5/2016 | Albrecht et al. |

FOREIGN PATENT DOCUMENTS

| | | |
|---|---|---|
| AU | 2003230993 | 11/2003 |
| BR | 0112901 | 6/2003 |
| BR | 0309598 | 2/2005 |
| CA | 2483104 | 11/2003 |
| CN | 1457600 | 11/2003 |
| CN | 1592906 | 3/2005 |
| CN | 1647160 | 7/2005 |
| EP | 0769749 | 4/1997 |
| EP | 1176826 | 7/2003 |
| EP | 1349370 | 10/2003 |
| EP | 1406403 | 4/2004 |
| EP | 1504445 | 8/2008 |
| JP | 2002247610 | 8/2002 |
| JP | 2003524199 | 8/2003 |
| JP | 2004320752 | 11/2004 |
| WO | 9527349 | 10/1995 |
| WO | 9702672 | 1/1997 |
| WO | 0004662 | 1/2000 |
| WO | 0019699 | 4/2000 |
| WO | 0119088 | 3/2001 |
| WO | 0124027 | 4/2001 |
| WO | 0131497 | 5/2001 |
| WO | 0140963 | 6/2001 |
| WO | 0146782 | 6/2001 |
| WO | 0153922 | 7/2001 |
| WO | 0175743 | 10/2001 |
| WO | 0191109 | 11/2001 |
| WO | 0205517 | 1/2002 |
| WO | 0211123 | 2/2002 |
| WO | 0215081 | 2/2002 |
| WO | 0217591 | 2/2002 |
| WO | 0219625 | 3/2002 |
| WO | 0227600 | 4/2002 |
| WO | 0237381 | 5/2002 |
| WO | 0245034 | 6/2002 |
| WO | 02061652 | 8/2002 |
| WO | 02065305 | 8/2002 |
| WO | 02065318 | 8/2002 |
| WO | 02069121 | 9/2002 |
| WO | 03009277 | 1/2003 |
| WO | 03091990 | 11/2003 |
| WO | 03094499 | 11/2003 |
| WO | 03096337 | 11/2003 |
| WO | 2004010352 | 1/2004 |
| WO | 2004040416 | 5/2004 |
| WO | 2004040475 | 5/2004 |
| WO | 2004061699 | 7/2004 |
| WO | 2005025217 | 3/2005 |
| WO | 2005064885 | 7/2005 |
| WO | 2008044664 | 4/2008 |
| WO | 2008045950 | 4/2008 |
| WO | 2008110002 | 9/2008 |
| WO | 2008110790 | 9/2008 |
| WO | 2009011206 | 1/2009 |
| WO | 2009061651 | 5/2009 |
| WO | 2009064561 | 5/2009 |
| WO | 2010095320 | 8/2010 |
| WO | 2010127268 | 11/2010 |
| WO | 2012117872 | 12/2012 |
| WO | 2012177870 | 12/2012 |
| WO | 2012177874 | 12/2012 |

OTHER PUBLICATIONS

United States Patent and Trademark Office, "Final Office Action", issued in connection with U.S. Appl. No. 13/443,596, dated Feb. 26, 2015.

United States Patent and Trademark Office, "Final Office Action", issued in connection with U.S. Appl. No. 13/793,991, dated Feb. 27, 2015.

United States Patent and Trademark Office, "Non-Final Office Action", issued in connection with U.S. Appl. No. 13/778,108, dated Feb. 27, 2015.

United States Patent and Trademark Office, "Non-Final Office Action", issued in connection with U.S. Appl. No. 13/341,646, dated Mar. 3, 2015.

Japanese Patent Office, "Notice of Reasons for Rejection", issued in connection with Japanese Patent Application No. P2014-517158, dated Mar. 3, 2015 (7 pages).

Mexican Patent Office, "Notice of Allowance", issued in connection with Mexican Patent Application No. MX/a/2014/000281, dated Feb. 25, 2015 (1 page).

United States Patent and Trademark Office, "Notice of Allowance", issued in connection with U.S. Appl. No. 13/793,983, dated Mar. 16, 2015.

United States Patent and Trademark Office, "Notice of Allowance", issued in connection with U.S. Appl. No. 13/472,170, dated Mar. 26, 2015.

United States Patent and Trademark Office, "Final Office Action", issued in connection with U.S. Appl. No. 13/341,661, dated Mar. 26, 2015.

European Patent Office, "European Search Report", issued in connection with European Patent Application No. 12803215.8, dated Apr. 20, 2015 (9 pages).

Canadian Patent Office, "Office Action", issued in connection with Canadian Patent Application No. 2,840,092, dated Apr. 20, 2015 (4 pages).

United States Patent and Trademark Office, "Final Office Action", issued in connection with U.S. Appl. No. 13/455,961, dated May 20, 2015.

State Intellectual Property Office of China, "Notice of Allowance" issued in connection with Application No. 201210105474.3, May 25, 2015.

United States Patent and Trademark Office, "Final Office Action", issued in connection with U.S. Appl. No. 13/793,974, dated May 28, 2015.

Canadian Intellectual Property Office, "Office Action", issued in connection with Canadian Patent Application No. 2,840,094, dated May 19, 2015 (4 pages).

United States Patent and Trademark Office, "Non-Final Office Action", issued in connection with U.S. Appl. No. 14/089,279, dated Mar. 28, 2014.

United States Patent and Trademark Office, "Final Office Action", issued in connection with U.S. Appl. No. 14/089,279, dated Nov. 21, 2014.

United States Patent and Trademark Office, "Non-Final Office Action", issued in connection with U.S. Appl. No. 14/089,279, dated Apr. 23, 2015.

European Patent Office, "European Search Report", issued in connection with European Patent Application No. 12802805.7, dated May 27, 2015 (8 pages).

European Patent Office, "European Search Report", issued in connection with European Patent Application No. 12802746.3, dated May 27, 2015 (9 pages).

United States Patent and Trademark Office, "Notice of Allowance", issued in connection with U.S. Appl. No. 13/341,646, dated Jun. 19, 2015

Mexican Patent Office, "Notice of Allowance", issued in connection with Mexican Patent Application No. MX/a/2014/000280, dated Jun. 12, 2015, 1 page.

United States Patent and Trademark Office, "Notice of Allowance", issued in connection with U.S. Appl. No. 13/472,170, dated Jul. 7, 2015.

United States Patent and Trademark Office, "Notice of Allowance", issued in connection with U.S. Appl. No. 13/793,983, dated Jul. 7, 2015.

United States Patent and Trademark Office, "Non-Final Office Action," issued in connection with U.S. Appl. No. 13/341,661, mailed Mar. 19, 2013.

U.S. Appl. No. 13/793,974, filed Mar. 11, 2013 (58 pages).

(56) References Cited

OTHER PUBLICATIONS

U.S. Appl. No. 13/793,991, filed Mar. 11, 2013 (47 pages).
U.S. Appl. No. 13/778,108, filed Feb. 26, 2013, (66 pages).
Canadian Intellectual Property Office, "Office Action," issued in connection with application No. CA 2,773,567, on Mar. 6, 2014 (2 pages).
State Intellectual Property Office of China, "First Office Action," issued in connection with application No. CN 201210105474.3, on Feb. 8, 2014 (15 pages).
International Bureau, "International Preliminary Report on Patentability" issued in connection with International Application No. PCT/US2012/043544, dated Jan. 9, 2014 (9 pages).
United States Patent and Trademark Office, "Final Office Action", issued in connection with U.S. Appl. No. 13/443,596, dated Apr. 9, 2014.
United States Patent and Trademark Office, "Final Office Action", issued in connection with U.S. Appl. No. 13/793,991, dated Apr. 11, 2014.
United States Patent and Trademark Office, "Non-Final Office Action", issued in connection with U.S. Appl. No. 13/341,646, dated Jun. 5, 2014.
United States Patent and Trademark Office, "Final Office Action", issued in connection with U.S. Appl. No. 13/793,983, dated Jun. 6, 2014.
United States Patent and Trademark Office, "Final Office Action", issued in connection with U.S. Appl. No. 13/472,170, dated Jun. 18, 2014.
IP Australia, "Examination Report", issued in connection with Australian Patent Application No. 2012272868, dated Jun. 27, 2014 (3 pages).
IP Australia, "Examination Report", issued in connection with Australian Patent Application No. 2012272874, dated Jun. 27, 2014 (3 pages).
IP Australia, "Examination Report", issued in connection with Australian Patent Application No. 2012272872, dated Jun. 24, 2014 (4 pages).
United States Patent and Trademark Office, "Notice of Allowance", issued in connection with U.S. Appl. No. 13/341,661 dated Jul. 8, 2014.
IP Australia, "Examination Report", issued in connection with Australian Patent Application No. 2013204488, dated Aug. 12, 2014 (5 pages).
IP Australia, "Examination Report", issued in connection with Australian Patent Application No. 2013203778, dated Aug. 21, 2014 (5 pages).
IP Australia, "Examination Report", issued in connection with Australian Patent Application No. 2012272876, dated Sep. 18, 2014 (4 pages).
United States Patent and Trademark Office, "Non-Final Office Action", issued in connection with U.S. Appl. No. 13/443,596, dated Sep. 25, 2014.
United States Patent and Trademark Office, "Non-Final Office Action", issued in connection with U.S. Appl. No. 13/455,961, dated Dec. 5, 2014.
United States Patent and Trademark Office, "Non-Final Office Action", issued in connection with U.S. Appl. No. 13/767,548, dated Feb. 3, 2015.
United States Patent and Trademark Office, "Non-Final Office Action", issued in connection with U.S. Appl. No. 13/793,959 dated Jan. 30, 2015.
United States Patent and Trademark Office, "Non-Final Office Action", issued in connection with U.S. Appl. No. 13/793,991, dated Nov. 10, 2014.
United States Patent and Trademark Office, "Notice of Allowance", issued in connection with U.S. Appl. No. 13/341,646, dated Nov. 3, 2014.
United States Patent and Trademark Office, "Notice of Allowance", issued in connection with U.S. Appl. No. 13/472,170, dated Dec. 5, 2014.

United States Patent and Trademark Office, "Notice of Allowance", issued in connection with U.S. Appl. No. 13/793,983, dated Jan. 9, 2015.
United States Patent and Trademark Office, "Non-Final Office Action", issued in connection with U.S. Appl. No. 13/793,974, dated Feb. 18, 2015.
United States Patent and Trademark Office, "Corrected Notice of Allowance", issued in connection with U.S. Appl. No. 13/472,170, dated Feb. 12, 2015.
United States Patent and Trademark Office, "Notice of Allowance," issued in connection with U.S. Appl. No. 12/890,216 on Aug. 6, 2013.
United States Patent and Trademark Office, "Office Action," issued in connection with U.S. Appl. No. 13/472,170 on Nov. 8, 2013.
United States Patent and Trademark Office, "Office Action," issued in connection with U.S. Appl. No. 13/793,983 on Nov. 8, 2013.
United States Patent and Trademark Office, "Office Action," issued in connection with U.S. Appl. No. 13/443,596 on Nov. 21, 2013.
United States Patent and Trademark Office, "Office Action," issued in connection with U.S. Appl. No. 13/793,991 on Dec. 6, 2013.
International Searching Authority, "International Search Report and Written Opinion of the International Searching Authority," issued in connection with International Application No. PCT/US2012/043535, mailed on Feb. 21, 2013, 15 pages.
United States Patent and Trademark Office, "Notice of Allowance," issued in connection with U.S. Appl. No. 13/341,661 on Sep. 23, 2013.
R. Pantos, Ed., & W. May, Apple Inc. "HTTP Live Streaming: draft-pantos-httplive-streaming-07", Sep. 2011 (33 pages).
Apple Inc. "Timed Metadata for HTTP Live Streaming", Apr. 28, 2011 (12 pages).
Apple Inc. "HTTP Live Streaming Overview", Apr. 1, 2011 (36 pages).
Eric Winkelman, "Timed Text Tracks and TV Services", Aug. 15, 2011 (5 pages).
U.S. Appl. No. 13/433,596, filed Apr. 10, 2012 (41 pages).
"What is Jacked?," http://www.jacked.com/, retrieved on Dec. 3, 2009 (1 page).
Anderson, "Google to compete with Nielsen for TV-ratings info?," Ars Technica, Jun. 19, 2006 (3 pages).
Boehret, "Yahoo Widgets Lend Brains to Boob Tube," The Wall Street Journal, Mar. 25, 2009 (4 pages).
Claburn, "Google Researchers Propose TV Monitoring," Information Week, Jun. 7, 2006 (4 pages).
Evain, "TV-Anytime Metadata—A Preliminary Specification on Schedule!," EBU Technical Review, Sep. 2000 (15 pages).
Heuer et al., "Adaptive Multimedia Messaging based on MPEG-7—The M3-Box,", Proc. Second Int'l Symposium on Mobile Multimedia Systems Applications, Nov. 9-10, 2000 (8 pages).
Heussner, "Sound-Triggered Smart Phone Ads Seek You Out,"Adweek.com, http://www.adweek.com/news/advertising-branding/sound-triggered-smartphone-ads-seek-you-out-136901, Dec. 7, 2011 (3 pages).
Hopper, "EBU Project Group P/META Metadata Exchange Standards," EBU Technical Review, Sep. 2000 [http://www.ebu.ch/en/technical/trev/trev_284-contents.html, retrieved on Jul. 20, 2006] (25 pages).
Kane, "Entrepreneur Plans On-Demand Videogame Service," The Wall Street Journal, Mar. 24, 2009 (2 pages).
Laven,"EBU Technical Review (Editor ial)," No. 284, Sep. 2000 [http://www.ebu.ch/en/technical/trev/trev_284-contents.html, retrieved on Jul. 20, 2006] (3 pages).
Mulder, "The Integration of Metadata From Production to Consumer," EBU Technical Review, Sep. 2000 [http://www.ebu.ch/en/technical/trev/trev_284-contents.html, retrieved on Jul. 20, 2006] (6 pages).
U.S. Appl. No. 13/455,961, filed Apr. 25, 2012 (61 pages).
Canadian Intellectual Property Office, "Office Action," issued in connection with Canadian Application Serial No. 2,574,998, mailed Aug. 26, 2008 (4 pages).
Canadian Intellectual Property Office, "Office Action," issued in connection with Canadian Application Serial No. 2,574,998, mailed Mar. 23, 2009 (5 pages).

(56) References Cited

OTHER PUBLICATIONS

Canadian Intellectual Property Office, "Office Action," issued in connection with Canadian Application Serial No. 2,574,998, mailed Nov. 13, 2009 (10 pages).
Patent Cooperation Treaty, "International Search Report," issued in connection with International Application Serial No. PCT/US2003/14970, mailed Feb. 10, 2004 (1 page).
Patent Cooperation Treaty, "International Preliminary Examination Report," issued in connection with International Application Serial No. PCT/US2003/014970, completed Aug. 21, 2004 (6 pages).
Patent Cooperation Treaty, "International Search Report," issued in connection with International Application Serial No. PCT/US2003/031180, mailed Jun. 8, 2004 (5 pages).
Patent Cooperation Treaty, "International Preliminary Examination Report," issued in connection with International Application Serial No. PCT/US2003/031180, mailed Aug. 17, 2004 (4 pages).
Patent Cooperation Treaty, "International Search Report and Written Opinion," issued in connection with International Application Serial No. PCT/US2005/026426, mailed Aug. 18, 2006 (10 pages).
Patent Cooperation Treaty, "International Preliminary Report on Patentability," issued in connection with International Application Serial No. PCT/US2005/026426, mailed Feb. 1, 2007 (9 pages).
Patent Cooperation Treaty, "International Search Report and Written Opinion," issued in connection with International Application Serial No. PCT/US2009/061827, mailed Mar. 15, 2010 (12 pages).
Patent Cooperation Treaty, "International Search Report and Written Opinion," issued in connection with International Application Serial No. PCT/US2009/061750, mailed Mar. 3, 2010 (10 pages).
Patent Cooperation Treaty, International Search Report and Written Opinion, issued in connection with International Application Serial No. PCT/US2010/033201, mailed Oct. 1, 2010 (16 pages).
Patent Cooperation Treaty, "International Search Report and Written Opinion," issued in connection with International Application Serial No. PCT/US2009/061479, mailed May 26, 2010 (15 pages).
Patent Cooperation Treaty, "International Search Report and Written Opinion", issued in connection with International application No. PCT/US2012/043546, mailed Dec. 10, 2012, (6 pages).
Patent Cooperation Treaty, "International Search Report and Written Opinion", issued in connection with International application No. PCT/US2012/043539, mailed Jan. 17, 2013, (9 pages).
Patent Cooperation Treaty, "International Search Report and Written Opinion", issued in connection with International application No. PCT/US2012/043544, mailed Jan. 17, 2013, (15 pages).
Shazam, "Shazam and VidZone Digital Media announce UK1s first fixed price mobile download service for music videos," http://www.shazam.com/music/web/newsdetail.html?nid=NEWS136, Feb. 11, 2008 (1 page).
Shazam, "Shazam launches new music application for Facebook fans," http://www.shazam.com/music/web/newsdetail.html?nid=NEWS135, Feb. 18, 2008 (1 page).
Shazam, "Shazam turns up the volume on mobile music," http://www.shazam.com/music/web/newsdetail.html?nid=NEWS137, Nov. 28, 2007 (1 page).
Stross, "Apple Wouldn't Risk Its Cool Over a Gimmick, Would It?," The New York Times, Nov. 14, 2009 (3 pages).
Stultz, "Handheld Captioning at Disney World Theme Parks," article retrieved on Mar. 8, 2013, http://goflorida.about.com/od/disneyworld/a/wdw_captioning.htm, (1 page).
Sullivan, "Google Cozies Up to SMBs for Digital Content," MediaPost News, Mar. 19, 2009 (3 pages).
U.S. Appl. No. 61/499,520, filed Jun. 21, 2011 (51 pages).
U.S. Appl. No. 61/568,631, filed Dec. 8, 2011 (80 pages).
United States Patent and Trademark Office, "Advisory Action," issued in connection with U.S. Appl. No. 10/540,611, mailed Jan. 22, 2010.
United States Patent and Trademark Office, "Final Office Action," issued in connection with U.S. Appl. No. 10/540,611, mailed Sep. 29, 2009.
United States Patent and Trademark Office, "Non-Final Office Action," issued in connection with U.S. Appl. No. 10/540,611, mailed Mar. 4, 2009.
United States Patent and Trademark Office, "Non-Final Office Action," issued in connection with U.S. Appl. No. 10/540,611, mailed Sep. 15, 2008.
United States Patent and Trademark Office, "Non-Final Office Action," issued in connection with U.S. Appl. No. 12/890,216, mailed Apr. 2, 2012.
United States Patent and Trademark Office, "Notice of Allowance," issued in connection with U.S. Appl. No. 10/540,611, mailed Jun. 22, 2010.
United States Patent and Trademark Office, "Advisory Action," issued in connection with U.S. Appl. No. 11/618,245, mailed Sep. 30, 2009.
United States Patent and Trademark Office, "Final Office Action," issued in connection with U.S. Appl. No. 10/530,233, mailed Mar. 18, 2010.
United States Patent and Trademark Office, "Final Office Action," issued in connection with U.S. Appl. No. 11/618,245, mailed Jul. 21, 2009.
United States Patent and Trademark Office, "Non-Final Office Action," issued in connection with U.S. Appl. No. 10/530,233, mailed Sep. 16, 2009.
United States Patent and Trademark Office, "Non-Final Office Action," issued in connection with U.S. Appl. No. 11/618,245, mailed Feb. 5, 2009.
Van Beek et al., "Metadata-Driven Multimedia Access," IEEE Signal Processing Magazine, vol. 20, No. 2, Institute of Electric and Electronic Engineers, Inc., New York, New York, USA, Mar. 2003 (13 pages).
Vetro et al., "Video Transcoding Architectures and Techniques: An Overview," IEEE Signal Processing Magazine, vol. 20, No. 2, Institute of Electric and Electronic Engineers, Inc., New York, New York, USA, Mar. 2003 (12 pages).
Wactlar et al., "Digital Video Archives: Managing Through Metadata" Building a National Strategy for Digital Preservation: Issues in Digital Media Archiving, http://www.informedia.cs.cmu.edu/documents/Wactlar-CLIR-final.pdf, Apr. 2002 (14 pages).
Wang, "An Industrial-Strength Audio Search Algorithm," Shazam Entertainment, Ltd., in Proceedings of the Fourth International Conference on Music Information Retrieval, Baltimore, Oct. 26-30, 2003 (7 pages).
United States Patent and Trademark Office, "Non-Final Office Action," issued in connection with U.S. Appl. No. 12/890,216, mailed Nov. 29, 2012 (22 pages).
United States Patent and Trademark Office, "Requirement for Restriction," issued in connection with U.S. Appl. No. 10/530,233, mailed Jun. 10, 2009 (20 pages).
United States Patent and Trademark Office, "Non-Final Office Action," issued in connection with U.S. Appl. No. 11/618,245, mailed Apr. 28, 2011 (48 pages).
United States Patent and Trademark Office, "Final Office Action," issued in connection with U.S. Appl. No. 11/618,245, mailed Oct. 26, 2011 (38 pages).
IP Australia, "Notice of Acceptance", issued in connection with Australian Patent Application No. 2012272874, dated Sep. 11, 2015 (2 pages).
United States Patent and Trademark Office, "Non-Final Office Action", issued in connection with U.S. Appl. No. 13/455,961, dated Sep. 24, 2015.
United States Patent and Trademark Office, "Non-Final Office Action", issued in connection with U.S. Appl. No. 13/793,974, dated Sep. 24, 2015.
United States Patent and Trademark Office, "Non-Final Office Action", issued in connection with U.S. Appl. No. 13/443,596, dated Oct. 20, 2015.
United States Patent and Trademark Office, "Non-Final Office Action", issued in connection with U.S. Appl. No. 13/793,991, dated Oct. 22, 2015.
State Intellectual Property Office of China, "Office Action", issued in connection with Chinese Patent Application No. 201280032737.0, dated Nov. 10, 2015 (5 pages).

(56) References Cited

OTHER PUBLICATIONS

United States Patent and Trademark Office, "Final Office Action", issued in connection with U.S. Appl. No. 14/089,279, dated Nov. 17, 2015.
European Patent Office, "European Search Report" issued in connection with European Patent Application No. 12802202.7 dated May 28, 2015 (7 pages).
IP Australia, "Notice of Acceptance", issued in connection with Australian Patent Application No. 2012272868, dated Jul. 22, 2015 (2 pages).
Canadian Intellectual Property Office, "Office Action," issued in connection with Canadian Application Serial No. 2,773,567, on Mar. 27, 2015 (6 pages).
United States Patent and Trademark Office, "Final Office Action", issued in connection with U.S. Appl. No. 13/767,548 dated Aug. 11, 2015.
United States Patent and Trademark Office, "Final Office Action", issued in connection with U.S. Appl. No. 13/778,108 dated Aug. 13, 2015.
IP Australia, "Notice of Acceptance", issued in connection with Australian Patent Application No. 2012272872 dated Aug. 6, 2015 (2 pages).
United States Patent and Trademark Office, "Final Office Action", issued in connection with U.S. Appl. No. 13/793,959, dated Sep. 11, 2015.
European Patent Office, "Examination Report," issued in connection with application No. 12002599.4-1905 on Mar. 4, 2016 (4 pages).
United States Patent and Trademark Office, "Non-Final Office Action," issued in connection with U.S. Appl. No. 14/922,918, dated Feb. 23, 2016.
Canadian Intellectual Property Office, "Office Action," issued in connection with Canadian Patent Application No. 2,773,567, dated Mar. 9, 2016 (4 pages).
United States Patent and Trademark Office, "Final Office Action," issued in connection with U.S. Appl. No. 13/455,961, dated Mar. 23, 2016.
United States Patent and Trademark Office, "Final Office Action," issued in connection with U.S. Appl. No. 13/443,596, dated Apr. 6, 2016.
European Patent Office, "Communication Pursuant to Article 94(3) EPC," issued in connection with application No. 12002599.4 on Mar. 4, 2016 (4 pages).
United States Patent and Trademark Office, "Final Office Action," issued in connection with U.S. Appl. No. 13/793,991, dated Apr. 8, 2016.
IP Australia, "Notice of Acceptance," issued in connection with Australian Patent Application No. 2013204488, dated Apr. 26, 2016 (3 pages).
IP Australia, "Examination Report," issued in connection with Australian Patent Application No. 2012272876, dated Apr. 26, 2016 (3 pages).
United States Patent and Trademark Office, "Non-Final Office Action," issued in connection with U.S. Appl. No. 14/089,279, dated May 5, 2016.
United States Patent and Trademark Office, "Non-Final Office Action," issued in connection with U.S. Appl. No. 13/181,147, dated Nov. 21, 2012.
United States Patent and Trademark Office, "Non-Final Office Action," issued in connection with U.S. Appl. No. 13/181,147, dated Aug. 15, 2013.
United States Patent and Trademark Office, "Final Office Action," issued in connection with U.S. Appl. No. 13/181,147, dated Mar. 10, 2014.
United States Patent and Trademark Office, "Final Office Action," issued in connection with U.S. Appl. No. 13/181,147, dated Dec. 3, 2015.
United States Patent and Trademark Office, "Non-Final Office Action," issued in connection with U.S. Appl. No. 13/181,147, dated May 19, 2015.
United States Patent and Trademark Office, "Notice of Allowance," issued in connection with U.S. Appl. No. 13/181,147, dated Feb. 18, 2016.
United States Patent and Trademark Office, "Advisory Action," issued in connection with U.S. Appl. No. 13/181,147, mailed Oct. 15, 2014 (4 pages).
United States Patent and Trademark Office, "Notice of Allowance" issued in connection with U.S. Appl. No. 13/181,147, dated Feb. 18, 2016, 8 pages.
United States Patent and Trademark Office, "Non-Final Office Action", issued in connection with U.S. Appl. No. 14/922,918, dated Feb. 23, 2016, 17 pages.
United States Patent and Trademark Office, "Final Office Action", issued in connection with U.S. Appl. No. 13/443,596, dated Apr. 6, 2016, 25 pages.
European Patent Office, "Communication Pursuant to Article 94(3) EPS," issued in connection with application No. 12002599.4 on Mar. 4, 2016, (4 pages).
United States Patent and Trademark Office, "Final Office Action", issued in connection with U.S. Appl. No. 13/793,991, dated Apr. 8, 2016, 23 pages.
IP Australia, "Notice of Acceptance", issued in connection with Australian Patent Application No. 2013204488, dated Apr. 26, 2016 (3 pages).
IP Australia, "Examination Report", issued in connection with Australian Patent Application No. 2012272876, dated Apr. 26, 2016, 3 pages.
United States Patent and Trademark Office, "Non-Final Office Action", issued in connection with U.S. Appl. No. 14/089,279, dated May 5, 2016, 29 pages.
United States Patent and Trademark Office, "Final Office Action", issued in connection with U.S. Appl. No. 13/778,108, dated May 23, 2016, 13 pages.
The State Intellectual Property Office of China, "Office Action", issued in connection with Chinese Patent Application No. 201280032740.2, dated May 31, 2016 (22 pages).
IP Australia, "Notice of Acceptance", issued in connection with Australian Patent Application No. 2012272876, dated Jun. 6, 2016 (2 pages).
United States Patent and Trademark Office, "Notice of Allowance", issued in connection with U.S. Appl. No. 13/341,661, dated Aug. 19, 2016, 9 pages.
United States Patent and Trademark Office, "Non-Final Office Action", issued in connection with U.S. Appl. No. 14/922,918, dated Sep. 9, 2016 (16 pages).
IP Australia, "Examination Report", issued in connection with Australian Patent Application No. 2015252031, dated Oct. 21, 2016 (3 pages).
United States Patent and Trademark Office, "Notice of Allowance", issued in connection with U.S. Appl. No. 14/089,279, dated Nov. 14, 2016 (13 pages).
The State Intellectual Property Office of China, "First Office Action", issued in connection with Chinese Patent Application No. 201280032738.5, dated Dec. 16, 2016 (13 pages).
United States Patent and Trademark Office, "Non-Final Office Action", issued in connection with U.S. Appl. No. 14/725,877, dated Jan. 26, 2017, 14 pages.
United States Patent and Trademark Office, "Non-Final Office Action", issued in connection with U.S. Appl. No. 15/331,568, dated Feb. 24, 2017, 9 pages.
European Patent Office, "Examination Report", issued in connection with European Patent Application No. 12802746.3, dated Feb. 23, 2017, 6 pages.
Canadian Intellectual Property Office, "Notice of Allowance," issued in connection with application No. 2,773,567, on Mar. 30, 2017, 1 page.
United States Patent and Trademark Office, "Final Office Action", issued in connection with U.S. Appl. No. 14/922,918, dated Apr. 6, 2017, 18 pages.

* cited by examiner

METHODS AND APPARATUS TO VALIDATE A TAG FOR MEDIA

RELATED APPLICATIONS

This patent is a continuation of U.S. patent application Ser. No. 13/181,147, filed on Jul. 12, 2011, entitled "METHODS AND APPARATUS TO GENERATE A TAG FOR MEDIA CONTENT," which claims the benefit of U.S. Provisional Patent Application Ser. No. 61/474,728, filed Apr. 12, 2011, entitled METHODS AND APPARATUS TO GENERATE A TAG FOR MEDIA CONTENT." U.S. patent application Ser. No. 13/181,147 and U.S. Provisional Patent Application Ser. No. 61/474,728 are hereby incorporated by reference in their entireties.

The present disclosure relates generally to identifying media content and, more particularly, to methods and apparatus to generate a tag for media content.

FIELD OF THE DISCLOSURE

The present disclosure relates generally to identifying media content and, more particularly, to methods and apparatus to generate a tag for media content.

BACKGROUND

Media content is distributed over many different distribution channels. For example, the same media content may be distributed over a broadcast system (e.g., cable, satellite, terrestrial, etc.) and may be distributed over the internet. Media content distributed over broadcast systems is often transmitted with identifying information embedded in or otherwise associated with the media content (e.g., watermarks) so that monitoring of the exposure to the media content at presentation locations (e.g., households) can be performed. Additionally or alternatively, identifying information comprising one or more characteristics of the media content (e.g., signatures) can be collected, labeled with known identifying information, and stored prior to distribution of the media content so that the media content can be later identified by extracting the signatures at a reception site and accessing the identifying information by matching the signatures extracted at the reception site to the stored signatures.

DETAILED DESCRIPTION

Figure 1:
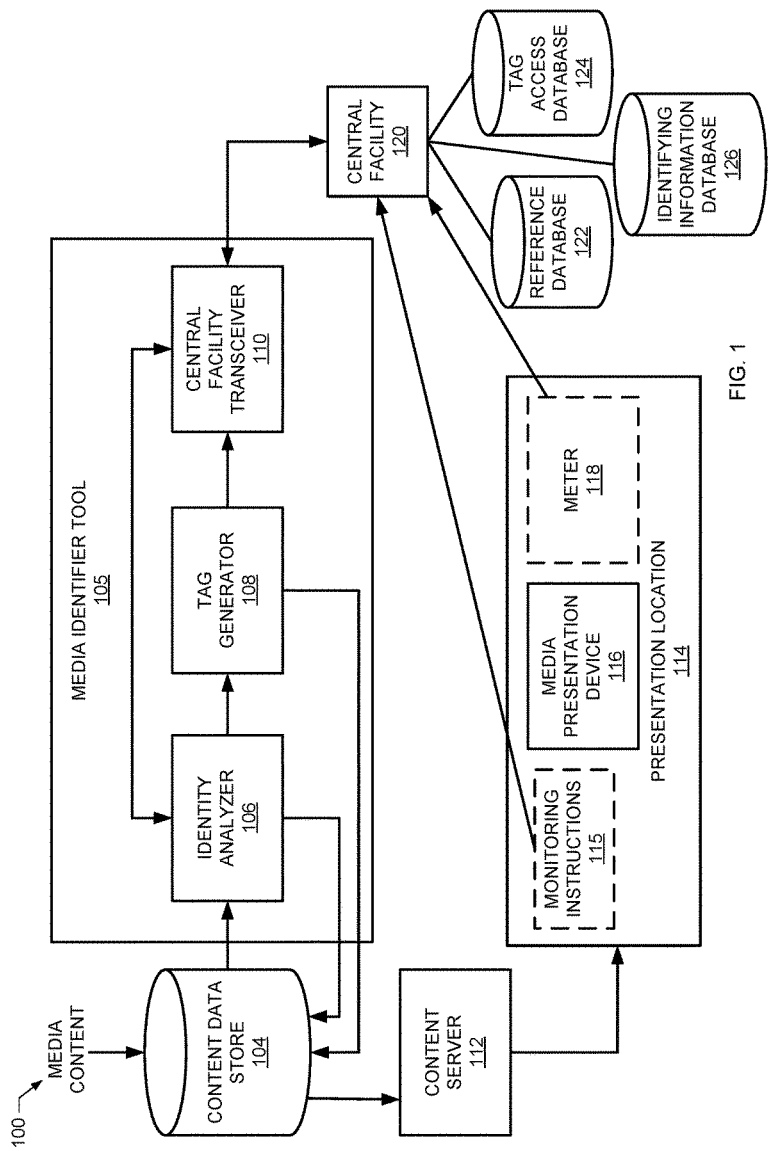
FIG. 1 is a block diagram of an example system to generate a tag for media content and to retrieve the tag at a presentation location for analysis at a central facility.

Advances in technology result in changes to the specifications defining the use of identifying information (e.g., watermarks, signatures, codes, etc.) for media content. In other words, the particular identifying information embedded in, associated with, extracted from, and so forth from media content changes over time. Example methods, apparatus, and articles of manufacture disclosed herein generate one or more identifying tags for media content (e.g., programs or advertising).

As used herein, "identifying information" includes information that is inserted in media content for the purpose of identifying the media content (e.g., watermarks, codes, etc.) and/or includes information inherent to one or more aspects of the media content (e.g., the audio, the video, etc.) or to one or more aspects of the signal representing the media content, which inherent information identifies the media content (e.g., signatures, fingerprints, etc.). Such inherent information is not inserted for the purpose of identifying the media content.

As used herein "attribute data" is information that identifies media content such as, for example, a source identifier (SID), a media asset identifier (MAID), a signature value for media content, a title of the media content, an identification of a creator of the media content, a timestamp indicating when the media content was broadcast, etc. Identifying information may include attribute data. For example, a SID (attribute data) may be included in a watermark (identifying information) inserted in media content. In another example, a signature value (identifying information) generated for media content may be associated with a MAID (attribute data) in a reference database.

As used herein a "tag" is a string of letters and/or numbers that are associated with media content so that the media content can be identified. In some examples, the tag includes attribute data and/or identifying information that has been extracted from the media content. By associating a tag with media content, the processing needed to determine identifying information (e.g., extracting watermarks, generating signatures, etc.) can be performed once (e.g., prior to distribution) and the media content can be identified (e.g., after distribution) by reading the tag for the distributed media content without, for example, re-extracting the watermark, regenerating the signature, etc. Furthermore, when the tag includes identifying information or attribute data included in the identifying information, records of presentation of the media content collected using the tag can be combined with records from distribution systems that include identifying information in the media content (but do not necessarily use the tags to identify the media content).

In some examples, identifying information (e.g., watermarks embedded in the media content, signatures collected and labeled for the media content, etc.) for the media content has been previously associated with the media content. In some such examples, the identifying information can be obtained and used to generate the tag(s). The example tag(s) can be associated with media content prior to distribution (e.g., before internet media content is streamed to presentation locations (e.g., households)). For example, the tag(s) may be associated with the media content in a webpage distributing the media content, inserted in metadata of the media content (e.g., in a file containing the media content or a file associated with the file containing the media content), inserted in metadata of a stream, etc. The example tag(s) can later be extracted at presentation location(s) and analyzed to identify the media content and increment records for exposure to the media content. Where the tag(s) are generated based on identifying information used to identify the media content in other monitoring systems (e.g., watermarks or signatures used to identify the media content in a television broadcast system), media content presentation records collected using the tags may be combined with or compared to the records from the other distribution systems. In some examples, the identifying information and the tag(s) may be collected at a presentation location. The tag(s) may be compared with the identifying information to validate that the tag(s) are correct (e.g., to confirm that the tag(s) correctly identify the media content). If the format of the previously associated identifying information changes (e.g., technology developments may change the details of the watermarks, signatures, etc.), new tag(s) can be generated using the adaptable tag structure described herein.

FIG. 1 is a block diagram of an example system 100 to generate a tag for media content and to retrieve such tag at a presentation location 114 for analysis at a central facility 120.

In the example system 100, media content is added to a content data store 104. In the illustrated example, some media content is identified in a reference library of the central facility 120 by identifying information embedded in or otherwise broadcast with the media content (e.g., watermarks), some media content is identified in a reference library stored by the central facility 120 based on identifying information inherent in the program (e.g., using media content signatures), some media content is associated with identifying information to enable embedding of the identifying information (e.g., adding watermarks), and some media content is unknown. In other examples, any combination of methods for identifying media content may be used. In the illustrated example identifying information and/or other attribute data is stored with the media content in the content data store 104. Alternatively, the metadata may be stored in another device linked to the content data store 104 and/or linked to devices that require access to the metadata.

The content data store 104 may be any combination of one or more data storage devices. For example, the content data store 104 may be one or more databases, one or more network storage locations, one or more hard drives, one or more files, one or more extensible markup language (XML) files, any combination of the foregoing, etc. In the illustrated example, the content data store 104 provides media content to the media identifier tool 105 for tagging the media content. The example content data store 104 receives media content that has been associated with identifying information (e.g., watermarks, signatures, etc.) from the media identifier tool 105 and/or receives tags that identify the media content from the media identifier tool 105. The content data store 104 provides media content to the content server 112 for distribution to presentation locations (e.g., the presentation location 114).

The example media identifier tool 105 of FIG. 1 receives media content from the content data store 104 and analyzes the media content to generate a tag for the media content and, in some instances, to embed or otherwise associate identifying information with the media content. The media identifier tool 105 of the illustrated example retrieves identifying information from the central facility 120. In the illustrated example, the media identifier tool 105 includes an identity analyzer 106, a tag generator 108, and a central facility transceiver 110.

The example identity analyzer 106 of FIG. 1 determines that media content is available for analysis at the content data store 104. For example, the media content may be transmitted from the content data store 104 to the identity analyzer 106 when new content is received, at periodic or aperiodic intervals, etc. Alternatively, the identity analyzer 106 may periodically or aperiodically query the content data store 104 to determine if there is content to be analyzed (e.g., content that has not yet been tagged, content that has been tagged in error, etc.). For example, the identity analyzer 106 may query the content data store 104 for content that is not yet associated with a tag, for content identified on a list of invalid tags, etc.

The example identity analyzer 106 of FIG. 1 attempts to identify the content to be analyzed. The example identity analyzer 106 of FIG. 1 uses one or more of the following techniques to identify the media content: extracting identifying information embedded in the media content (e.g., watermarks, codes, etc.) and querying a reference database with the embedded information, determining identifying information which is inherent in the media content or portion(s) of the signal representing the media content (e.g., signatures) and querying a reference database with the characteristic data, and/or reading identifying information and/or attribute information input to the identity analyzer 106 or otherwise provided to the identity analyzer 106 (e.g., an XML file storing identifying information input by a user).

As used herein, the term "embedded" includes modifying any portion (e.g., the audio, the video, etc.) of the media content to store identifying information (e.g., by amplifying or attenuating portions of the audio portion, by shifting portions of the audio portion, by modifying a video and/or an image portion of the media content to store identifying information (e.g., by amplifying or attenuating portions of the video portion, changing colors of portions of the video portion, etc.)).

In the illustrated example, the identity analyzer 106 accesses the reference database at the central facility 120 via the central facility transceiver 110 to obtain identifying information based on characteristic data representative of the media content (or part thereof) and/or a signal (or portion thereof) representing the media content. After the identity analyzer 106 obtains inherent identifying information (e.g., a signature) from the media content, the identity analyzer 106 queries reference data using the inherent identifying information to obtain attribute data associated with (e.g., mapped to) the inherent identifying information. For example, the reference database can be generated by obtaining inherent identifying information for known media content and storing the inherent identifying information in the reference database in association with known attribute data. Alternatively, a reference database may be stored at the identity analyzer 106 or any other location accessible by the identity analyzer. In some examples, the identity analyzer 106 will not need to access the reference database when the media content has been watermarked.

In some examples, the identity analyzer 106 may embed (or otherwise associate) identifying information that has been input to the identity analyzer 106 in (or with) the media content. For example, the identity analyzer 106 may embed a watermark in the media content using information in a received XML file. When a watermark is embedded or associated with the media content, the media content with the watermark is transmitted to the content data store 104 for distribution. In addition, information about the watermark is communicated to the central facility 120 via the central facility transceiver 110. If the media content cannot be identified by any available techniques, the example identity analyzer 106 provides an error message to an operator of the media identifier tool 105 to enable or prompt manual identification.

The identity analyzer 106 of the illustrated example transmits the information identifying the media content to the tag generator 108 (e.g., information obtained from the media content, information retrieved from the central facility 120, information received from an operator, etc.). The information may be any combination of identifying information and/or attribute data associated with the identifying information.

In the illustrated example, attribute data extracted from identifying information includes a 4-digit source identifier (SID), a time and date stamp, and an identifier for the type of code (e.g., an indication of whether the media content is from a network television broadcast or a cable television broadcast). Alternatively, any other identifying information and/or attribute data may be transmitted to the tag generator 108 from the identity analyzer 106. Attribute data may include one or more of a station identifier, a channel identifier, a title, a producer, a broadcast time, a serial number, a code identifier, a signature value, website identifier, etc.

The example tag generator 108 of FIG. 1 receives identifying information and/or attribute data for media content and generates a tag for the media content. In the illustrated example, the generated tag is a numeric string having six attribute type identifiers prefixing six attribute data elements. The example tag includes an attribute type identifier and attribute data element for each of a tag version, a cyclic redundancy check (CRC) key, a SID, a media asset ID (MAID) identifying the media content in a reference database, a code type, a time and date stamp, and a tick (duration from the start of the media content). According to the illustrated example, the attribute type identifier is a two digit number indicating what type of data follows the attribute type identifier (e.g., attribute type identifier 99 precedes 6 digits indicating the tag version).

An example generated tag and data used for generating the tag are shown in Table 1. Table 2 illustrates example attribute data from a watermark that may be extracted from the first 9 seconds of a media content file. The example watermark in Table 1 is generated from the last row of the watermark data (i.e., timestamp 788939798 that is 9 seconds into the media content file).

TABLE 1

Example tag generation

| | Example Value | Attribute Type | Attribute Data |
|---|---|---|---|
| Tag Version | 0.0.1 | 99 | 000001 |
| CRC key | 123456789 | 98 | 09123456789 |
| SID | 9004 | 02 | 049004 |
| CODE type | FD | 06 | 01 |
| Time/Date Stamp | 788939798 | 03 | 788939798 |
| Tick (Duration) | 9 | 04 | 019 |

Tag = "990000010204900406010378893979804019980912345 6789"

TABLE 2

Example attribute data from a watermark

| ENCODE TS (UTC) | FILE TIME | SID | LEVEL | TYPE | BLOCK | STRENGTH | CHANNEL |
|---|---|---|---|---|---|---|---|
| 788939791 | 1 | 9004 | FD | U | 177 | 16 | 1 |
| 788939792 | 3 | 9004 | FD | U | 364 | 11 | 1 |
| 788939794 | 5 | 9004 | FD | U | 551 | 17 | 1 |
| 788939796 | 7 | 9004 | FD | U | 738 | 20 | 1 |
| 788939798 | 9 | 9004 | FD | U | 925 | 21 | 1 |

Table 3 is a description of the attribute types and structure of the example tag generation. Any other attribute types, data formats, tag structures, etc. may be used.

TABLE 3

Example attribute descriptions and definitions

| Attribute Type | Attribute Type Description | Attribute Data | Attribute Data Description |
|---|---|---|---|
| 99 | Name: Tag structure Version. Description: If there is a change in the structure definition it can be reflected by this attribute so that the correct tag is produced and consumed | 011053 | Structure: six digit number of the form VVMMNN where: VV = Major Version Number, MM = Minor Version Number, NN = Incremental number Each field will be padded with a leading 0 in case of a single digit number. Example: 1.10.53 = Attribute Data = 011053 |
| 98 | Name: Tag Integrity Description: This tag holds the string that is generated by a CRC type of algorithm. | 09123456789 | Structure: LLXXXXX . . . X LL = two digit number indicating the length of the CRC String XXXXX . . . X = The CRC String Example: CRC string = 123456789 Length = 9 Attribute Data = 09123456789 |
| 01 | Name: Media Asset ID (MAID) | 06105600 | Structure: LLXXXX . . . X LL = two digit number indicating the length of the MAID XXXXX . . . X = The MAID Example: MAID = 105600 Length = 6 Attribute Data = 06105600 |

TABLE 3-continued

Example attribute descriptions and definitions

| Attribute Type | Attribute Type Description | Attribute Data | Attribute Data Description |
| --- | --- | --- | --- |
| 02 | Name: SID | 041004 | Structure: LLXXXX . . . X<br>LL = two digit number indicating the length of the SID<br>XXXXX . . . X = The SID<br>Example:<br>SID = 1004<br>Length = 4<br>Attribute Data = 041004 |

In some examples, the tag generator 108 generates the tag by making a call to a tag generation application programming interface (API) and passing the identification information. The API may be made available at the media identifier tool (e.g., as part of the tag generator 108) or may be provided by the central facility 120 via the central facility transceiver 110.

The tag generator 108 of the illustrated example transmits the generated tag to the content data store 104 for storage of the tag in association with the media content. In some examples, the example tag generator 108 also transmits the tag to the central facility 120 via the central facility transceiver 110 for later comparison with tags detected at the presentation location 114. In some examples, the tag generator 108 does not transmit the tag to the central facility 120. For example, the central facility may not need to receive the tag because the central facility 120 may obtain and/or decode the identifying information from the tag itself.

The central facility transceiver 110 of the illustrated example communicatively couples the media identifier tool 105 with the central facility 120. The example central facility transceiver 110 of FIG. 1 is a network communication device that is linked to the central facility by one or more networks (e.g., the internet, a local area network, a wide area network, etc.). Alternatively, the central facility transceiver 110 may be any other device to communicatively couple the media identifier tool 105 with the central facility. An example network linking the media identifier tool 105 with the central facility 120 may also link the media identifier tool 105 with the content data store 104.

The content server 112 of the illustrated example is communicatively coupled with the content data store 104 and the presentation location 114 to provide media content from the content data store 104 to the presentation location 114. For example, the content server 112 may be a web server that provides media content to the presentation location 114 in response to a request for the media content from the presentation location 114. Alternatively, the content server 112 may by any device for media content distribution.

For media content that has previously been associated with a tag in the content data store 104, the example content server 112 distributes the tag with the media content. In the illustrated example, the tag is inserted in a metadata field of an Adobe® Flash® video file so that the tag is sent to the presentation location 114 when the Adobe® Flash® video file is sent to the presentation location. When the presentation location 114 requests media content from the content server 112, the content server 112 transmits an Adobe® Flash® video player to the presentation location 114. The Adobe® Flash® video player executes at the presentation location 114 and requests the particular media content Adobe video file corresponding to the request from the presentation location 114. The content server 112 transmits the Adobe® Flash® video file with the tag in the metadata to the video player. Alternatively, any other arrangement may be used. For example, the tag may be associated with the media content in a markup language file (e.g., a hypertext markup language (HTML).

The presentation location 114 of the illustrated example requests, receives, and presents media content. For example, the presentation location may be a household, a business, a public location, etc. Typically, the presentation location 114 requests media content that has been requested by a user residing at the presentation location.

The example presentation location 114 of FIG. 1 includes a media presentation device 116. The media presentation device 116 of the illustrated example is the device that requests media content from the content server 112 and receives and presents that media content. In the illustrated example, the media presentation device 116 is a personal computer executing a web browser that can make requests for media content and execute an Adobe® Flash® video player provided by the content server 112. Alternatively, the media presentation device 116 may be any type of device such as, for example, a desktop computer, a laptop computer, a mobile device, a cellular device, a wireless device, a television, a billboard, a projector, etc. While a single media presentation device 116 is shown in the illustrated example, any number or type of media presentation device(s) may be located at the presentation location 114.

The example presentation location 114 includes monitoring instructions 115 and a meter 118 to extract identifying information from presented media content and to transmit the identifying information to the central facility 120 for analysis.

In the illustrated example, the monitoring instructions 115 are computer instructions (e.g., JavaScript, JAVA, etc.) that are transmitted from the content server 112 to the presentation location 114 along with the Adobe® Flash® video player and/or in association with the video content. The computer instructions 115 extract tags from media content presented at the presentation location 114 and transmit the tags to the central facility 120. In addition, the computer instructions 115 transmit information identifying the presentation location 114 to the central facility 120. For example, the computer instructions 115 may transmit an internet protocol (IP) address, a serial number, an identification stored in a cookie, or any other identifier.

In some examples, the monitoring instructions 115 may be transmitted to the presentation location at a time other than when the media content and/or video player is transmitted from the content server 112 to the presentation location 114. The monitoring instructions may be implemented in any manner such as, for example, computer instructions in any instruction language, a browser toolbar or plugin, any other type of plugin for a computer, a device installed at the presentation location, etc. The monitoring instructions may transmit tags to the content server 120 for any media content available at the presentation location 114 such as, for example, media content that is received at the presentation location 114, media content that is presented at the presentation location 114, media content that is presented at the presentation location 114 but is not viewed or heard, media content that is stored at the presentation location 114, media content that is transmitted from the presentation location 114 to another presentation location, etc. While the example monitoring instructions 115 of the illustrated example transmit the tag and information identifying the presentation location 114 to the central facility 120, the monitoring instructions 115 may transmit any additional or alternative information such as, for example, information about trick play of the media content, information about user input, etc.

The meter 118 of the illustrated example analyzes media content presented at the media presentation location 116 to obtain identifying information and transmit the identifying information to the central facility 120. The example meter 118 obtains watermarks embedded in or otherwise associated with the media content. At least when analyzed media content does not include a watermark, the example meter 118 extracts signature information from the media content. The example meter 118 also transmits tags associated with the media content to the central facility 120. Because the identifying information (e.g., signatures, watermarks, etc.) are transmitted to the central facility 120 with the tags, the central facility can compare the information to confirm that the tags have been accurately associated with the media content (e.g., to confirm that the wrong tag has not been associated with the media content).

In the illustrated example, the meter 118 is implemented in software that is installed on the media presentation device 116 when a user of the media presentation device 116 joins a panel. Alternatively, the meter 118 may be a device that is communicatively coupled to the media presentation device 116, may be software that is distributed to the general public, may be software that is automatically installed on the media presentation device 116 without user interaction, may be software that is installed by a user of the media presentation device 116, etc.

While, for simplicity of illustration, a single media presentation location 114 is illustrated in FIG. 1, multiple media presentation locations will typically be present. Furthermore, while the presentation location 114 includes the monitoring instructions 115 and the meter 118, presentation locations may include either the monitoring instructions 115 or the meter 118. For example, a first set of media presentation 114 locations may include only the monitoring instructions 115 and a second set of media presentation locations 114 different from the first set may include the meter 118. In other examples, media presentation locations 114 of a panel may include the meter 118 and all media presentation locations 114 (including the media presentation locations 114 in the panel) may include the monitoring instructions 115.

The example central facility 120 of FIG. 1 communicates with the media identifier tool 105 to receive tags and identifying information for media content and to provide identifying information for media content to the media identifier tool 105. In addition the example central facility 120 receives identifying information for presented media content from the presentation location 114. The central facility 120 may store the identifying records in any type of data storage (e.g., a database, a log file, etc.). The example central facility 120 of FIG. 1 includes a reference database 122 that stores identifying information for known media content (e.g., media associated with a code or signature that has been previously associated with identifying information), a tag access database 124 that stores records of tags received from the presentation location 114, and an identifying information database 126 that stores records of identifying information (e.g., signatures, watermarks, etc.) received from the presentation location 114.

In the illustrated example, the central facility 120 credits presentation records based on the tags received from the media presentation location 114. For example, if the central facility 120 receives a tag identifying a particular media content by a combination of SID, timestamp, and code type, the central facility 120 will credit the identified media content as having been presented. The central facility 120 may also validate the tags when identifying information and/or attribute data for media content is received with the tags. In other words, the central facility 120 compares the tags (i.e., the information represented by the tags) to other identifying information (e.g., watermarks, signatures) and/or attribute data to identify invalid tags. For example, the central facility 120 may compare an SID retrieved from a tag to an SID extracted from a watermark or code embedded in or otherwise associated with the media content. In another example, the central facility 120 may compare a MAID retrieved from a tag to a MAID determined by querying the reference database 122 with a signature extracted from the media content. The example central facility stores a listing of invalid tags (e.g., in the tag access database 124) to prevent those tags from being used to credit presentation records. The central facility 120 may also notify the content data store 104 that an invalid tag is being used. Such notification may be electronically transmitted or may be manually performed by an operator of the central facility.

While an example manner of implementing the system 100 has been illustrated in FIG. 1, one or more of the elements, processes and/or devices illustrated in FIG. 1 may be combined, divided, re-arranged, omitted, eliminated and/or implemented in any other way. Further, the content data store 104, the media identifier tool 105, the identity analyzer 106, the tag generator 108, the central facility transceiver 110, the content server 112, the presentation location 114, the monitoring instructions 115, the media presentation device 116, the meter 118, and the central facility 120 may be implemented by hardware, software, firmware and/or any combination of hardware, software and/or firmware. Thus, for example, any of the content data store 104, the media identifier tool 105, the identity analyzer 106, the tag generator 108, the central facility transceiver 110, the content server 112, the presentation location 114, the monitoring instructions 115, the media presentation device 116, the meter 118, and the central facility 120 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the content data store 104, the media identifier tool 105, the identity analyzer 106, the tag generator 108, the central facility transceiver 110, the content server 112, the presentation location 114, the monitoring instructions 115, the media presentation device 116, the meter 118, and the central facility 120 are hereby expressly defined to include a computer readable medium such as a memory, DVD, CD, etc. storing the software and/or firmware. Further still, the example system 100 of FIG. 1 may include one or more elements, processes and/or devices in addition to, or instead of, those illustrated in FIG. 1, and/or may include more than one of any or all of the illustrated elements, processes and devices.

FIGS. 2-6 are flow diagrams representative of example machine readable instructions that may be executed to generate and process tags to implement the example system 100 of FIG. 1. The example processes of FIGS. 2-6 may be implemented using machine readable instructions that, when executed, cause a device (e.g., a programmable controller, processor, or other programmable machine or integrated circuit) to perform the operations shown in FIGS. 2-6. For instance, the example processes of FIGS. 2-6 may be performed using a processor, a controller, and/or any other suitable processing device. For example, the example processes of FIG. 2-6 may be implemented using coded instructions stored on a tangible machine readable medium such as a flash memory, a read-only memory (ROM), and/or a random-access memory (RAM).

As used herein, the term tangible computer readable medium is expressly defined to include any type of computer readable storage and to exclude propagating signals. Additionally or alternatively, the example processes of FIGS. 2-6 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, the example processes of FIGS. 2-6 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example processes of FIGS. 2-6 may be implemented as any combination(s) of any of the foregoing techniques, for example, any combination of firmware, software, discrete logic and/or hardware.

Although the example processes of FIGS. 2-6 are described with reference to the flow diagrams of FIGS. 2-6, other methods of implementing the processes of FIGS. 2-6 may be employed. For example, the order of execution of the blocks may be changed, and/or some of the blocks described may be changed, eliminated, sub-divided, or combined. Additionally, one or more of the example processes of FIGS. 2-6 may be performed sequentially and/or in parallel by, for example, separate processing threads, processors, devices, discrete logic, circuits, etc.

Figure 2:
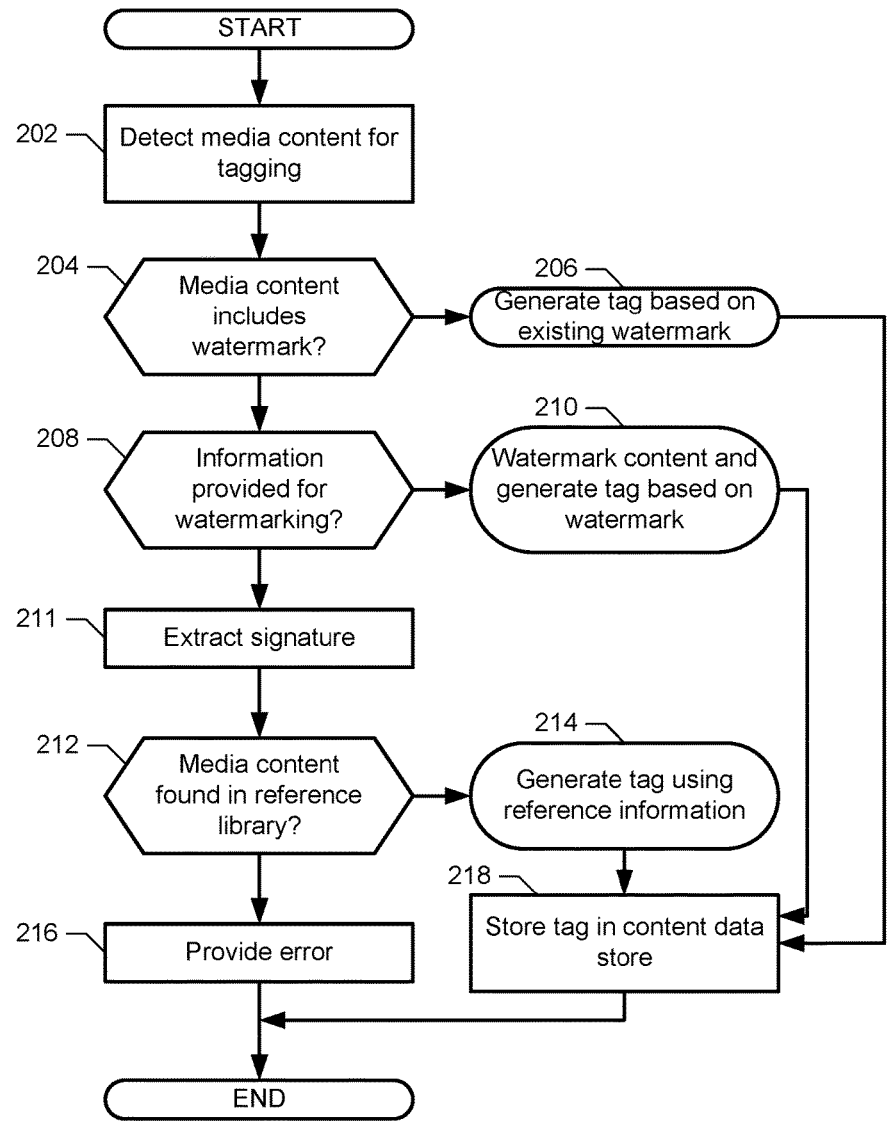
FIG. 2 is a flowchart representative of example machine readable instructions that may be executed to generate a tag for media content.

Turning in detail to FIG. 2, initially, the identity analyzer 106 detects media content for tagging (block 202). For example, the identity analyzer 106 may receive a notification or request from the content data store 104 or may query the content data store 104 for available media content. The identity analyzer 106 then determines if a watermark or other identifying information or attribute data is included in the media content (block 204). If the identity analyzer 106 determines that a watermark or other identifying information or attribute data is included in the media content, control proceeds to block 206 and a tag is generated based on the existing watermark and/or other identifying information and/or attribute data, which is described below in conjunction with FIG. 3.

If the identity analyzer 106 determines that a watermark and/or other identifying information and/or attribute data is not included in the media content (block 204), the identity analyzer 106 determines if identifying information has been provided for watermarking the media content (block 208). For example, an XML file including an identification of the media content (e.g., by file name) and identifying information (e.g., watermark information) may be input to the identity analyzer 106 or similar data may be input by an operator of the identity analyzer 106. If the identity analyzer 106 determines that identifying information has been provided, control proceeds to block 210 to generate and associate a watermark and/or other identifying information and/or attribute data with the media content and to generate a tag for the watermark and/or other identifying information and/or attribute data, which is described in conjunction with FIG. 4.

In the identity analyzer 106 determines that identifying information has not been provided (block 208), the identity analyzer determines if the media content is found in a reference library (block 210). The identity analyzer 106 of the illustrated example generates a signature for the media content and determines if a matching signature can be found in the reference database 122 at the central facility 120 (block 211). If the identity analyzer 106 determines that the media content is found in the reference library (block 212), control proceeds to block 214 to generate a tag using the identifying information from the reference library, which is described in conjunction with FIG. 5.

If the media content is not found in a reference library (block 212), the example identity analyzer 106 provides an error indicating that a tag could not be generated (block 216). Alternatively, the identity analyzer 106 could prompt an operator of the identity analyzer 106 to input identifying information and/or attribute data so that a tag could be generated in a similar manner to the process described in FIG. 3 in which identifying information is retrieved based on a watermark associated with the media content. After providing the error (block 216), the process of FIG. 2 terminates until additional media content for tagging is detected.

Turning to block 218, after block 206, block 210, or block 214 complete, the tag generator 108 transmits the generated tag to the content data store 104 (block 218). Metadata associated with inherent information (e.g., a signature) generated in block 214 may also be transmitted to the content data store 104. Then, the process of FIG. 2 terminates until additional media content for tagging is detected.

Figure 3:
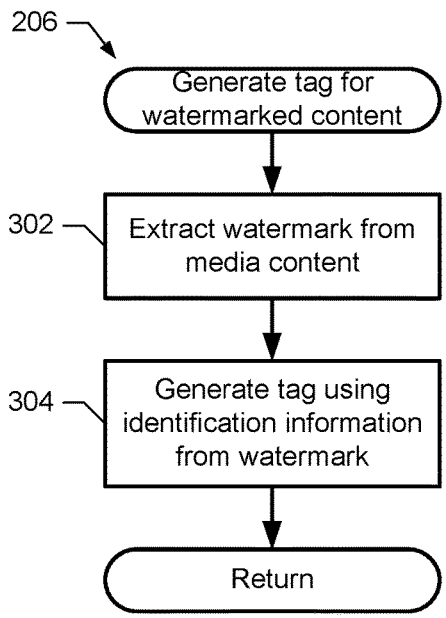
FIG. 3 is a flowchart representative of example machine readable instructions that may be executed to generate a tag for watermarked content.

FIG. 3 is a flowchart of example machine readable instructions that may be executed to implement block 206 of FIG. 2. The identity analyzer 106 extracts embedded identifying information (e.g., a watermark or an identification code) from the media content (block 302). Example watermark information extracted from example media content is shown in Table 2. The tag generator 108 generates the tag from the extracted identifying information (block 304). The example tag generator 108 generates the tag by concatenating several sets of attribute type values and data values as shown in Table 1. Control then returns to block 218 of FIG. 2.

Figure 4:
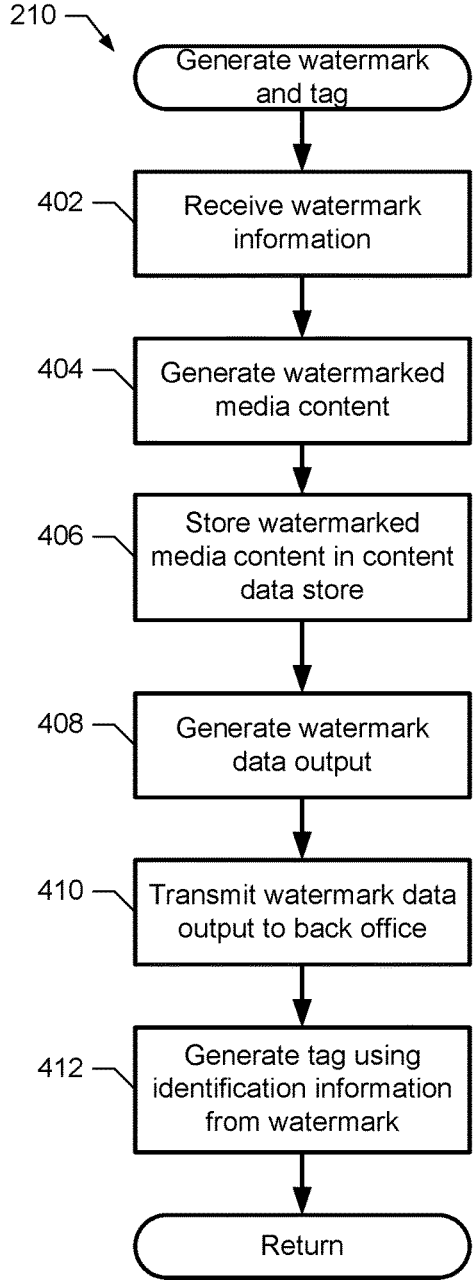
FIG. 4 is a flowchart representative of example machine readable instructions that may be executed to generate a watermark and a tag for media content.

FIG. 4 is a flowchart of example machine readable instructions that may be executed to implement block 210 of FIG. 2. The identity analyzer 106 retrieves watermark and/or other identifying information, metadata, and/or attribute data from the content data store 104 for watermarking the media content (block 402). For example, the identity analyzer 106 may receive an XML file with attribute data for the media content. The identity analyzer 106 then associates the watermark with the media content (block 404). Any desired watermarking technique may be employed. The identity analyzer 106 then transmits the watermarked media content to the content data store 104 for storage (block 406). The identity analyzer 106 then generates a watermark data output of information about the media content and the watermarks that have been inserted therein (block 408). The example identity analyzer 106 generates an XML watermark data output that includes the identifying information and/or other identifying information and/or attribute data for the media content and information about the watermark(s) that were embedded in the media content. The example identity analyzer transmits the watermark data output to the content data store 104 (block 410). Metadata associated with the watermarking may also be transmitted to the content data store 104. Then, the tag generator 108 generates a tag using the identification information from the watermark (block 412). The example tag generator 108 generates the tag by concatenating several sets of attribute type values and data values as shown in Table 1. Control advances to block 218 of FIG. 2.

Figure 5:
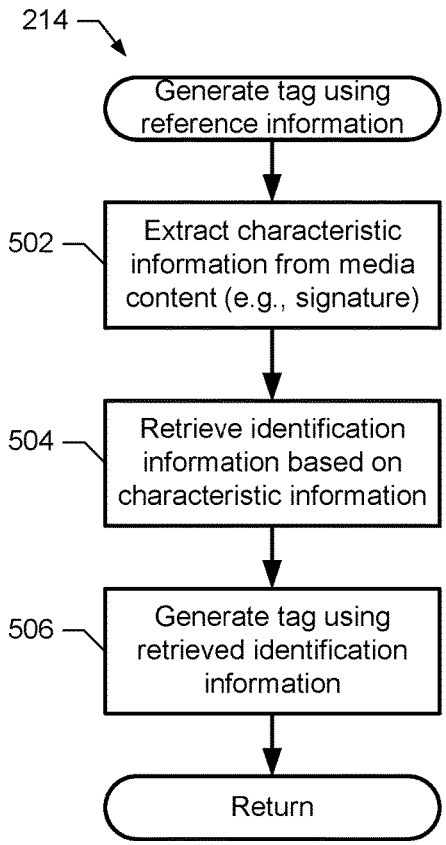
FIG. 5 is a flowchart representative of example machine readable instructions that may be executed to generate a tag using reference identifying information.

FIG. 5 is a flowchart of example machine readable instructions that may be executed to implement block 214 of FIG. 2. The identity analyzer 106 extracts inherent information (e.g., characteristic information) from the media content (e.g., a signature) (block 502). The example identity analyzer 106 retrieves attribute data and/or identifying information for the media content from the content data store 104 based on the inherent information (block 504). In the illustrated example, the identity analyzer 106 queries the content data store 104 to match the extracted signature information to reference signature information in the content data store 104 to retrieve the attribute data and/or identifying information. Then, the tag generator 108 generates a tag using the attribute data and/or identifying information associated with the media content by the signature (block 506). The example tag generator 108 generates the tag by concatenating several sets of attribute type values and data values as shown in Table 1. Control then advances to block 218 of FIG. 2.

Figure 6:
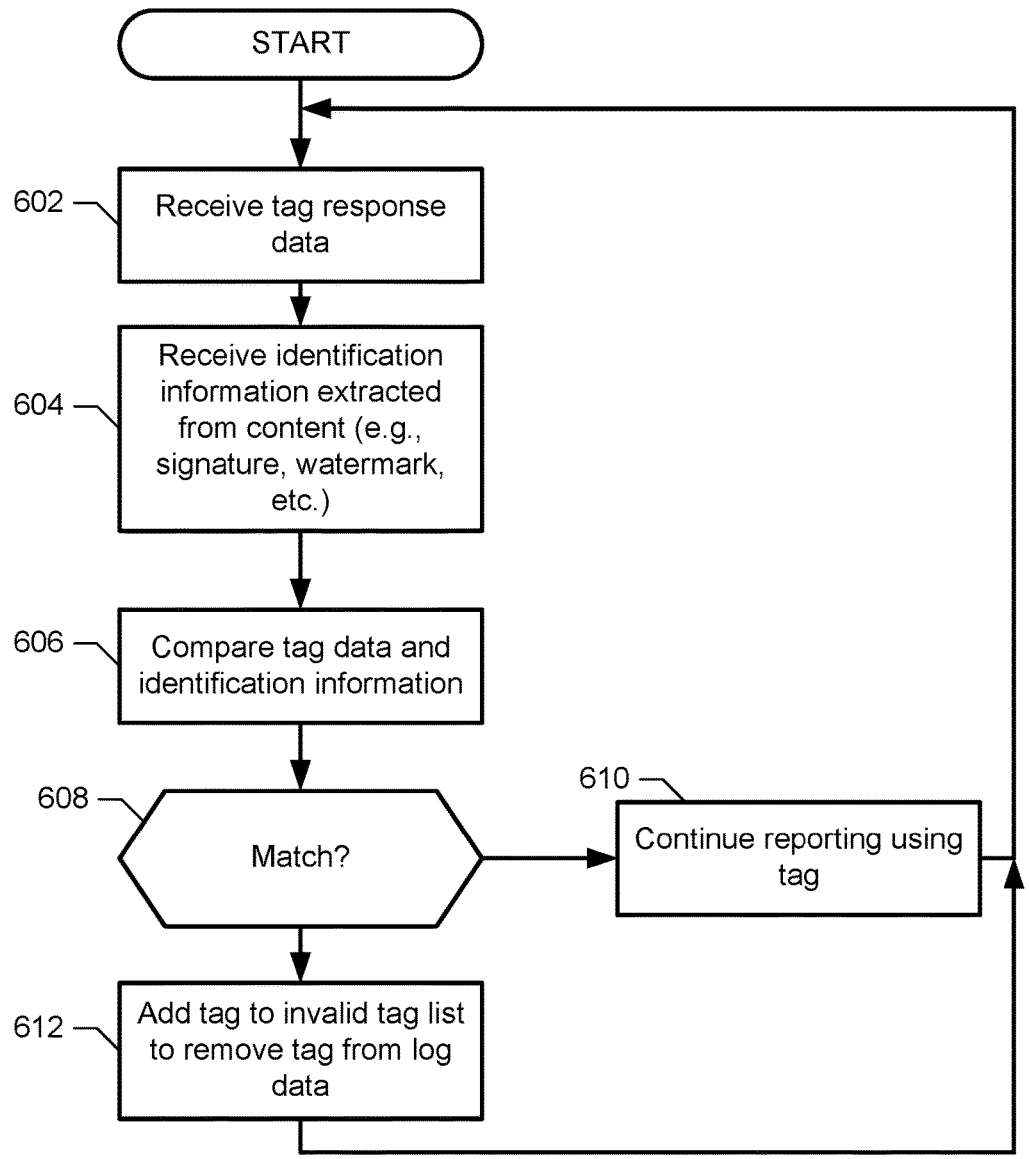
FIG. 6 is a flowchart representative of example machine readable instructions that may be executed to validate a tag that has been generated by the media identifier tool of FIG. 1.

FIG. 6 is a flowchart of example machine readable instructions that may be executed to validate tags that have been generated by the media identifier tool 105. The central facility 120 receives tag response data from the presentation location 114 (block 602). For example, the central facility 120 may receive tag response data from the meter 118 for media content that has been presented on the media presentation device 114. The central facility 120 also receives identifying information and/or attribute data extracted from the media content corresponding to the received tag (block 604). For example, the example meter 118 transmits extracted watermark or signature data for the media content that has been presented on the media presentation device 116. The central facility 120 then compares the tag data and the identification information to determine if they both identify the same media content (block 608). In the illustrated example, the identifying information is a stream of watermarks and/or signatures. The central facility 120 determines whether any of the watermarks and/or signatures in the stream substantially match the watermark and/or signature information in the tag. For example, the central facility 120 may check whether the SID and/or MAID in the tag matches the SID and/or MAID from watermark or signature information embedded in or associated with the media content. Tags may substantially match identifying information from a signature or watermark when they include the same values, when the majority of the values match, when the tag more closely matches the identification information than any other identifying information, when one or more values from the tag match attribute data associated with the identifying information, or when the identifying information more closely matches the tag than any other tag.

When the tag substantially matches the watermark or signature information (block 606), the tag may be marked as valid and/or reporting of exposure data using that tag will continue (block 610). For example, presentation of the media content may be credited based on the received tag data.

When the information in the tag does not match the watermark or signature information (block 606), the tag is added to an invalid tag list (e.g., in the tag access database 124) to remove the tag from exposure log data (block 612). Control then returns to block 602 to await reception of the next tag.

In some examples, the meter 118 is included at a subset of all presentation locations 114 (e.g., a set of presentation locations 114 selected for a panel) and other presentation locations 114 do not include a meter (i.e., are not panelists) but nonetheless receive the monitoring instructions 115. Accordingly, the presentation locations 114 that include the meter 118 will send both identifying information (e.g., watermark, signature, etc.) and tag information to the central facility 120. Upon receiving the first combination of tag information and identifying information from the meter 118, the central facility 120 performs the validation described in FIG. 6. If a tag is identified as valid, the example central facility 120 records that the tag has been validated and, in the illustrated example, the validation is not performed again for that tag. If a tag is identified as invalid, the example central facility 120 records that the tag is invalid and, in the illustrated example, the validation is not performed again for that tag. Alternatively, validation may be performed every time a tag/identifying information combination is received or may be performed at some interval (e.g., a random interval, a periodic interval, etc.). Accordingly, because the central facility 120 has recorded whether a tag is valid or invalid, when a tag is later received (e.g., a tag is received without identifying information), the central facility can determine whether the tag data should be trusted for use in reporting or should be ignored. In other words, when a tag has been marked as invalid, the media content identified (incorrectly) by the tag will not be credited as an exposure.

Figure 7:
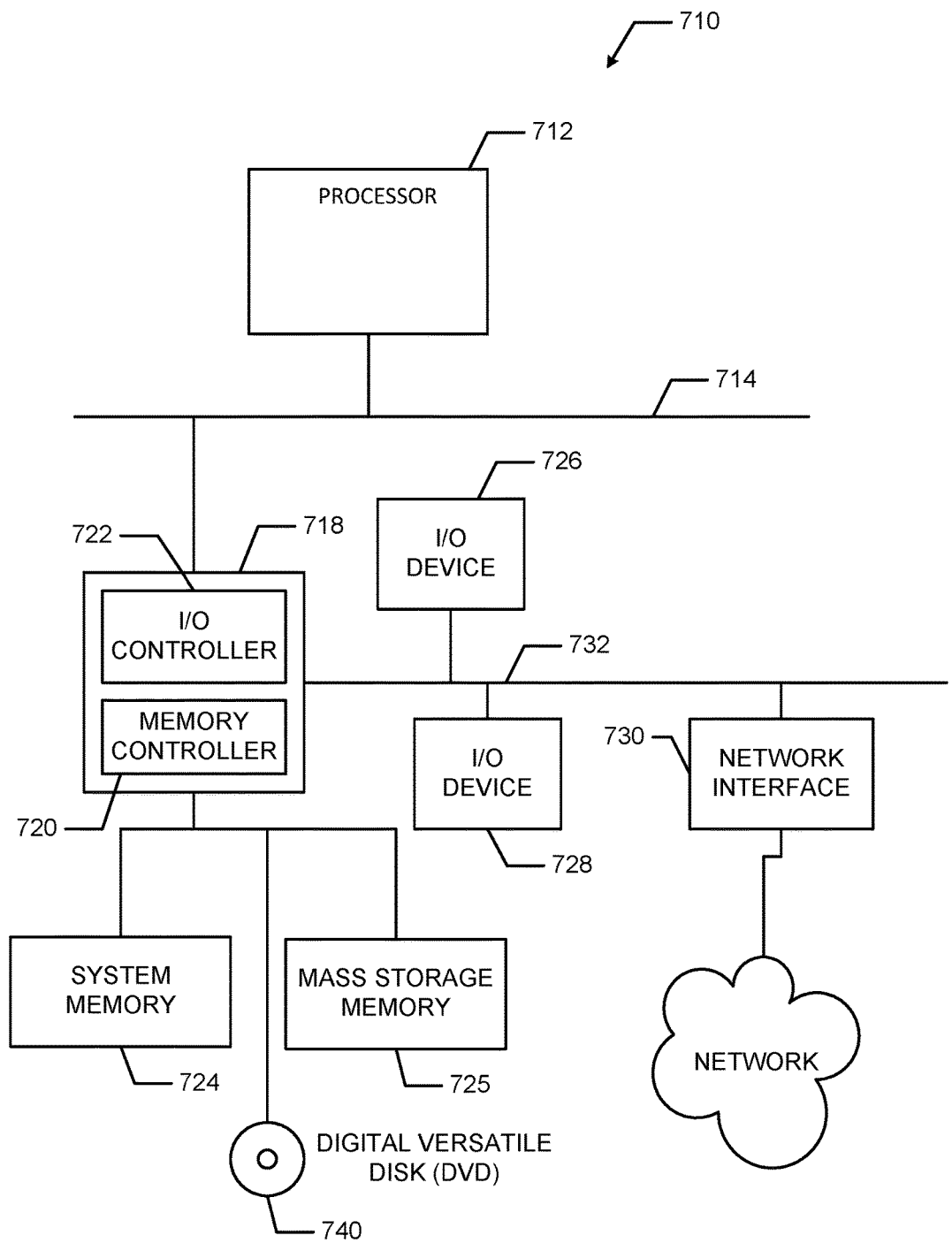
FIG. 7 is an example processor system that can be used to execute the example instructions of FIGS. 2-5 and/or 6 to implement the example apparatus of FIG. 1.

FIG. 7 is a block diagram of an example processor system 710 that may be used to execute the example instructions of FIGS. 2-6 to implement the example apparatus, methods, and/or systems described herein. As shown in FIG. 7, the processor system 710 includes a processor 712 that is coupled to an interconnection bus 714. The processor 712 may be any suitable processor, processing unit, or microprocessor. Although not shown in FIG. 7, the system 710 may be a multi-processor system and, thus, may include one or more additional processors that are identical or similar to the processor 712 and that are communicatively coupled to the interconnection bus 714.

The processor 712 of FIG. 7 is coupled to a chipset 718, which includes a memory controller 720 and an input/output (I/O) controller 722. A chipset provides I/O and memory management functions as well as a plurality of general purpose and/or special purpose registers, timers, etc. that are accessible or used by one or more processors coupled to the chipset 718. The memory controller 720 performs functions that enable the processor 712 (or processors if there are multiple processors) to access a system memory 724, a mass storage memory 725, and/or a digital versatile disk (DVD) 740.

In general, the system memory 724 may include any desired type of volatile and/or non-volatile memory such as, for example, static random access memory (SRAM), dynamic random access memory (DRAM), flash memory, read-only memory (ROM), etc. The mass storage memory 725 may include any desired type of mass storage device including hard disk drives, optical drives, tape storage devices, etc. The computer-readable instructions represented by the flow charts described above may be stored in the system memory 724, the mass storage memory 725, and/or the DVD 740.

The I/O controller 722 performs functions that enable the processor 712 to communicate with peripheral input/output (I/O) devices 726 and 728 and a network interface 730 via an I/O bus 732. The I/O devices 726 and 728 may be any desired type of I/O device such as, for example, a keyboard, a video display or monitor, a mouse, etc. The network interface 730 may be, for example, an Ethernet device, an asynchronous transfer mode (ATM) device, an 802.11 device, a digital subscriber line (DSL) modem, a cable modem, a cellular modem, etc. that enables the processor system 710 to communicate with another processor system.

While the memory controller 720 and the I/O controller 722 are depicted in FIG. 7 as separate functional blocks within the chipset 718, the functions performed by these blocks may be integrated within a single semiconductor circuit or may be implemented using two or more separate integrated circuits.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to validate a tag, the method comprising:
   obtaining, by executing an instruction with a processor, first identification information extracted from a first tag distributed with first media presented at a first presentation location;
   obtaining, by executing an instruction with the processor, second identification information determined from at least one of a) inherent information of at least one of audio or video of the first media presented at the first presentation location or b) a watermark embedded in at least one of the audio or the video of the first media presented at the first presentation location;
   comparing, by executing an instruction with the processor, the first identification information with the second identification information;
   when first identification information does not substantially match the second identification information, preventing, by executing an instruction with the processor, the first tag from being used to report exposure of the first media;
   after preventing the first tag from being used, obtaining, by executing an instruction with the processor, third identification information extracted from a second tag distributed with second media presented at a second presentation location; and
   in response to determining that the second tag substantially matches the first tag, preventing, by executing an instruction with the processor, the second tag from being used to report exposure to the second media, wherein preventing the second tag from being used includes preventing the crediting of the second media as having been presented.

2. The method as defined in claim 1, further including, when the first identification information substantially matches the second identification information, crediting the first media as having been presented.

3. The method as defined in claim 2, further including generating a report of usage based on the crediting.

4. The method as defined in claim 1, wherein preventing the first tag from being used includes marking the first tag, and obtaining the third identification information is performed after the marking.

5. The method as defined in claim 1, wherein the second media is the first media.

6. The method as defined in claim 4, further including:
   after marking the first tag, obtaining fourth identification information extracted from a third tag distributed with third media presented at a third presentation location; and
   in response to determining that the third tag does not substantially match the first tag, crediting the third media as having been presented.

7. The method as defined in claim 1, wherein the second presentation location is the same as the first presentation location.

8. A tangible computer readable storage medium comprising instructions that, when executed, cause a machine to at least:
   obtain first identification information extracted from a first tag distributed with first media presented at a first presentation location;
   obtain second identification information determined from at least one of a) inherent information of at least one of audio or video of the first media presented at the first presentation location or b) a watermark embedded in at least one of the audio or the video of the first media presented at the first presentation location;
   compare the first identification information with the second identification information;
   when first identification information does not substantially match the second identification information, prevent the first tag from being used to report exposure of the first media;
   after preventing the first tag from being used, obtain third identification information extracted from a second tag distributed with second media presented at a second presentation location; and
   in response to determining that the second tag substantially matches the first tag, prevent the second tag from being used to report exposure to the second media, wherein the instructions, when executed, cause the machine to prevent the second tag from being used by preventing the crediting of the second media as having been presented.

9. The tangible computer readable storage medium as defined in claim 8, wherein the instructions, when executed, cause the machine to, when the first identification information substantially matches the second identification information, credit the first media as having been presented.

10. The tangible computer readable storage medium as defined in claim 9, wherein the instructions, when executed, cause the machine to generate a report of usage based on the crediting.

11. The tangible computer readable storage medium as defined in claim 8, wherein the instructions, when executed, cause the machine to, prevent the first tag from being used by marking the first tag, and the obtaining of the third identification information is performed after the marking.

12. The tangible computer readable storage medium as defined in claim 8, wherein the second media is the first media.

13. The tangible computer readable storage medium as defined in claim 11, wherein the instructions, when executed, cause the machine to:
   after marking the first tag, obtain fourth identification information extracted from a third tag distributed with third media presented at a third presentation location; and in response to determining that the third tag does not substantially match the first tag, credit the third media as having been presented.

14. The tangible computer readable storage medium as defined in claim 13, wherein the second presentation location is the same as the first presentation location.

15. A system comprising:
a central facility to obtain first identification information extracted from a first tag distributed with first media presented at a first presentation location;
a meter to:
obtaining second identification information determined from at least one of a) inherent information of at least one of audio or video of the first media presented at the first presentation location or b) a watermark embedded in at least one of the audio or the video of the first media presented at the first presentation location, and
transmit the second identification to the central facility;
wherein the central facility is to:
compare the first identification information with the second identification information and, when the first identification information does not substantially match the second identification information, prevent the first tag from being used to report exposure of the first media;
after preventing the first tag from being used, obtain third identification information extracted from a second tag distributed with second media presented at a second presentation location; and
in response to determining that the second tag substantially matches the first tag, prevent the second tag from being used to report exposure to the second media, wherein the central facility is to prevent the second tag from being used by preventing the crediting of the second media as having been presented.

16. The system as defined in claim 15, wherein the central facility is further to, when the first identification information substantially matches the second identification information, credit the first media as having been presented.

17. The system as defined in claim 16, wherein the central facility is further to generate a report of usage based on the crediting.

18. The system as defined in claim 15, wherein the central facility is to prevent the first tag from being used by marking the tag, and the obtaining of the third identification information is performed after the marking.

19. The system as defined in claim 15, wherein the second media is the first media.

20. The system as defined in claim 18, wherein the central facility is to:
after marking the first tag, obtain fourth identification information extracted from a third tag distributed with third media presented at a third presentation location; and
in response to determining that the third tag does not substantially match the first tag, crediting the third media as having been presented.

21. The system of as defined in claim 15, wherein the second presentation location is the same as the first presentation location.

* * * * *